US009282582B1

(12) United States Patent
Dunsbergen et al.

(10) Patent No.: US 9,282,582 B1
(45) Date of Patent: Mar. 8, 2016

(54) SLEEP CONTROL FOR NETWORK OF BLUETOOTH LOW ENERGY DEVICES

(71) Applicant: Aruba Networks, Inc., Sunnyvale, CA (US)

(72) Inventors: Ben Dunsbergen, San Jose, CA (US); Kiyo Kubo, Oakland, CA (US)

(73) Assignee: ARUBA NETWORKS, INC., Sunnyvale, CA (US)

(*) Notice: Subject to any disclaimer, the term of this patent is extended or adjusted under 35 U.S.C. 154(b) by 0 days.

(21) Appl. No.: 14/634,624

(22) Filed: Feb. 27, 2015

Related U.S. Application Data

(63) Continuation of application No. 14/634,572, filed on Feb. 27, 2015, now abandoned, which is a continuation-in-part of application No. 14/529,930, filed on Oct. 31, 2014.

(51) Int. Cl.
*H04W 52/02* (2009.01)
*H04W 80/04* (2009.01)
*H04W 88/06* (2009.01)
*H04W 28/04* (2009.01)
*H04W 72/04* (2009.01)
*H04W 76/02* (2009.01)
*H04W 48/12* (2009.01)
*H04W 4/00* (2009.01)
*H04W 88/08* (2009.01)

(52) U.S. Cl.
CPC .............. *H04W 76/02* (2013.01); *H04W 4/008* (2013.01); *H04W 48/12* (2013.01); *H04W 88/08* (2013.01)

(58) Field of Classification Search
CPC . H04W 52/02; H04W 52/0216; H04W 80/04; H04W 88/06; H04W 28/04; H04W 72/04
USPC ......................................... 370/311, 328, 329
See application file for complete search history.

(56) References Cited

U.S. PATENT DOCUMENTS

2005/0233789 A1* 10/2005 Maekawa ................ H04L 12/12
463/1
2015/0172391 A1* 6/2015 Kasslin ................... H04L 67/16
370/338

* cited by examiner

*Primary Examiner* — Ronald B Abelson
(74) *Attorney, Agent, or Firm* — Hewlett Packard Enterprise Patent Department

(57) ABSTRACT

Described herein are systems, methods and computer program products for controlling operation of wireless beacons, such as Bluetooth Low Energy beacons. Multiple beacons may be controlled centrally or may work together in a cooperative fashion such that signals can be exchanged between or repeated by beacons in order to allow for signals received at one beacon to reach another beacon without requiring further central interaction. Power settings of beacons may be altered to change power consumption or to change a detectable range of the beacons.

20 Claims, 24 Drawing Sheets

SLEEP CONTROL FOR NETWORK OF BLUETOOTH LOW ENERGY DEVICES

CROSS REFERENCE TO RELATED APPLICATIONS

This application is a continuation of U.S. application Ser. No. 14/634,572, filed Feb. 27, 2015, which is a continuation-in-part of U.S. application Ser. No. 14/529,930, filed Oct. 31, 2014, which is hereby incorporated by reference in its entirety.

FIELD

The present disclosure generally relates to wireless beacons and to wireless communication between devices. Specifically, various techniques and systems are provided for operation of and control of wireless beacons.

SUMMARY

Described herein are techniques for controlling wireless beacons, such as battery powered Bluetooth Low Energy beacons. Multiple beacons may be controlled centrally or may work together in a cooperative fashion such that signals can be exchanged between or repeated or relayed by beacons in order to allow for signals received at one beacon to reach another beacon without requiring further central interaction.

Wireless beacons typically operate by broadcasting beacon signals, also referred to herein as advertisements or advertisement packets. Wireless beacon signals can be received by other devices and used for a variety of actions including the ability to perform device self-location tracking, event automation, etc. In embodiments, beacon signals are radio frequency broadcasts made by a wireless beacon that contain small amounts of digital data, such as in a packet, for which no response is requested or expected. In embodiments, beacon signals are repetitive transmissions that announce a presence of a wireless beacon, typically providing an identifier for a wireless beacon. In various embodiments, a wireless beacon may receive a scan request, such as after transmitting an advertisement packet. In various embodiments, a scan request may use information from the transmitted advertisement packet and/or may request additional information from wireless beacon. Optionally, a wireless beacon may transmit a scan response, such as a scan response that includes status information.

Various beacon signals can be broadcast by a wireless beacon, though in order to be useful, an agreed upon standard is needed to allow a data packet included in a beacon signal to be properly understood. Useful communications standards that a wireless beacon may be compliant with include, but are not limited to, Bluetooth, Zigbee, Z-wave and other low power radio frequency data communications standards. In embodiments, a low power radio frequency data communications standard provides for less power usage and/or longer battery life than conventional radio frequency data communications standards typically used for high bandwidth data communications, like IEEE 802.11. For example, the Bluetooth Low Energy specification limits output power of a Bluetooth Low Energy device to 10 mW (+10 dBm), while 802.11 power limits are regulated by the FCC, which permits, in some instances, output powers up to 1 W (+30 dBm).

In various embodiments, a wireless beacon is compliant with one or more Bluetooth specifications, such as Bluetooth 4.0 or Bluetooth Low Energy, also referred to herein as BLE, or Bluetooth Smart. In one embodiment, a wireless beacon is compliant with the Apple iBeacon specification.

One advantage of Bluetooth beacons is the large installed base of Bluetooth compliant tablets, mobile phones and computers that can detect Bluetooth beacon signals. An advantage of BLE is the reduced power requirements as compared to, for example, WiFi. Due to their low power requirements, BLE beacons can operate for long periods of time, such as weeks, months or years, on coin cell batteries, allowing large numbers of beacons to be employed at a venue to allow venue-wide detection of beacon signals without requiring electrical power infrastructure.

Low power beacons provide another advantage in that the transmission power of a beacon signal can be set such that the beacon signal is undetectable or difficult to detect outside of a specific location, due to signal free space path loss and/or other path loss, such as due to obstructions between the beacon and a detector. A properly designed beacon configuration, then, allows beacon signals to be essentially confined to a target location, such as a building or room by selection of an appropriate location for the beacon, the transmission power, and potentially other factors, such as building materials and placement of walls or other obstructions.

Battery-life of a battery powered wireless beacon can be further extended by powering off the beacon during periods of unneeded operation or operating the beacon in a hibernation or dormant state where advertisements are not broadcast. Conventional methods for powering off or placing a beacon in a dormant state may include manual removal of batteries, manually switching off power or timer controlled state cycling.

In order to be remotely controllable, in embodiments, wireless beacons include a wireless receiver allowing for receipt of data packets from other devices. For example, in one embodiment, a wireless beacon is capable of both transmitting and receiving Bluetooth compliant signals, such as BLE signals. In this way, signals can be received at a wireless beacon, allowing the beacon to change its configuration or provide status information in response to a received request.

In an aspect, provided are methods for managing beacons, such as computer implemented methods. In an embodiment, a method of this aspect comprises receiving, at a wireless device, a request for a status of a wireless beacon, the wireless device including or being associated with a network transceiver that provides network communications compliant with a network communications standard, the wireless device including or being associated with a wireless transceiver compliant with a wireless communications standard; receiving a wireless advertisement packet using the wireless communications standard and/or the wireless transceiver; identifying the status of the wireless beacon using the wireless advertisement packet; transmitting the status of the wireless beacon using the network communications standard and/or the network transceiver; receiving a request to change a configuration of the wireless beacon, the request received using one or more of the network communications standard, the network transceiver, the wireless communications standard and the wireless transceiver; establishing a wireless communication channel using the wireless communications standard and/or the wireless transceiver; and transmitting instructions to change the configuration of the wireless beacon, the instructions being transmitted using the wireless communications channel. In embodiments, receiving the instructions at a wireless beacon facilitates changing the configuration of the wireless beacon.

Optionally, the network communications standard is any of a variety of network standards. In embodiments, the network communications standard is an IEEE 802.3 standard and/or an IEEE 802.11 standard. Optionally, the network transceiver is a wireless network transceiver that provides wireless network communications compliant with a wireless network communications standard. Optionally, the network transceiver is a wireless network transceiver that provides wireless network communications compliant with a wireless network communications standard to a plurality of wireless network devices. Optionally, multiple network transceivers are included in the wireless device, such as a wired network transceiver and a wireless network transceiver In embodiments, the wireless transceiver is useful for wireless communications with wireless beacons, such as using a wireless communications standard. Useful wireless communications standards include those used for communication with wireless beacons, such as low power wireless beacons. For example, in embodiments, the wireless communication standard is a Bluetooth standard, a Bluetooth v4.0 (or greater) standard and/or a Bluetooth Low Energy standard. Optionally, the wireless transceiver is connected to a Universal Serial Bus (USB) port of the wireless device.

Optionally, the wireless device is a wireless access point. Optionally, the wireless device provides a bridge between the network transceiver and the wireless transceiver. Optionally, the wireless transceiver is an internal component of the wireless device. Optionally, the wireless device comprises one or more wireless transceivers, such as wireless network transceivers and wireless communications transceivers, such as an IEEE 802.11 compliant wireless network transceiver and a Bluetooth compliant transceiver.

In embodiments, the status of the wireless beacon includes an identifier of the wireless beacon. Optionally, prior to receiving the status at the wireless device, the status may be relayed by one or more intermediate beacons. In various embodiments, receiving the status at a network device facilitates management of the wireless beacon by a controller. Useful controllers include standalone network devices or controllers implemented as a component, such as a software component, subroutine, or state machine of another device, such as a network device, bridge device, or access point.

In embodiments a useful controller is configured for managing one or more wireless beacons, such as a network of wireless beacons including a plurality of wireless beacons. For example, a controller that receives the status of the wireless beacon may use this information to determine whether the status or the configuration of the wireless beacon needs to be changed. Optionally, the network device may be in wireless communication range of only a subset of a network of wireless beacons. In some embodiments, wireless beacons may be configured to relay and/or retransmit received instructions, such as instructions to change a status or configuration of a wireless beacon.

Optionally, the instructions include an identifier associated with a wireless beacon. In embodiments, receiving the instructions at a wireless beacon including the indentifier causes the wireless beacon to change its configuration, such as by installing the configuration. In embodiments, receiving the instructions at a wireless beacon that does not include the identifier causes the wireless beacon to transmit the instructions, for example to another wireless beacon using the wireless communications standard. In this way, wireless beacons can act as relays to forward instructions to a target beacon device. In various embodiments, the instructions include identifiers for one or more intermediate beacons, such as identifiers defining a route for the instructions to reach a target beacon. Optionally, the configuration is a transmission parameter of the wireless beacon. Optionally, the configuration is firmware or software of the wireless beacon.

In an embodiment, a method of this aspect further comprises receiving a confirmation that the configuration of the wireless beacon has changed; and transmitting the confirmation using the network communications standard. Optionally, receiving the confirmation at a network device facilitates management of the wireless beacon by the network device.

In various embodiments, methods of this aspect further comprise transmitting a scan request, such as a scan request using information from a received wireless advertisement packet, such as an identifier of a transmitter of the wireless advertisement packet. Optionally, an embodiment further comprises receiving a scan response using a wireless communications standard, such as a scan response that includes a status of a wireless beacon. Optionally, the wireless beacon is battery powered and the status of the wireless beacon is a battery level. Optionally, identifying the status of a wireless beacon includes transmitting a scan request and receiving a scan response. Optionally, receiving the scan response at a controller facilitates management of the wireless beacon by the controller.

In another aspect, provided are methods for controlling a status of a wireless beacon. In embodiments, methods of this aspect are useful for controlling statuses of one or more wireless beacons, such as a plurality, array or network of wireless beacons. Optionally, each of the one or more wireless beacons are positioned in wireless communication with at least one other beacon. In a specific embodiment, a method of this aspect comprises transmitting, by a wireless beacon, wireless advertisement packets; monitoring for wireless transmissions including beacon shutdown signals; receiving a shutdown transmission including a beacon shutdown signal; transmitting a wireless shutdown packet; reducing a transmission rate of or ceasing transmission of the advertisement packets; monitoring for wireless transmissions including beacon wakeup signals, with the beacon wakeup signals triggering a wireless beacon to transition to an active state; receiving a wakeup transmission including a beacon wakeup signal; and transmitting a wireless wakeup packet. Optionally, with beacon shutdown signals trigger wireless beacons to transition to dormant states. Optionally, wireless shutdown packets include beacon shutdown signals. Optionally, wireless wakeup packets include beacon wakeup signals.

Useful wireless beacons include those compliant with one or more wireless standards. Optionally, the wireless beacon is compliant with a Bluetooth standard, a Bluetooth Smart standard, and/or a Bluetooth v4.0 (or greater) standard.

In various embodiments, receiving the transmitted wireless shutdown packet at other wireless beacons facilitates transitioning the other wireless beacons to dormant states. Optionally, receiving the transmitted wireless shutdown packet at other wireless beacons facilitates transmission of wireless shutdown packets by the other wireless beacons.

In various embodiments, receiving the transmitted wireless wakeup packet at other wireless beacons facilitates transitioning the other wireless beacons to active states. Optionally, receiving the transmitted wireless wakeup packet at other wireless beacons facilitates transmission of wireless wakeup packets by the other wireless beacons.

Optionally, receiving the shutdown transmission includes receiving a wireless packet including the beacon shutdown signal or receiving the shutdown transmission using a wired data connection. Optionally, receiving the wakeup transmission includes receiving a wireless packet including the beacon wakeup signal or receiving the wakeup transmission using a wired data connection.

In various embodiments, timers are utilized for transmitting wireless packets, such for the transmission of wireless shutdown packets and/or wireless wakeup packets. In one embodiment, transmitting the wireless shutdown packet includes transmitting wireless packets including beacon shutdown signals for a specified time period. In one embodiment, transmitting the wireless wakeup packet includes transmitting wireless packets including beacon wakeup signals for a specified time period.

Optionally, the wireless beacon is battery powered. In embodiments, reducing a transmission rate of or ceasing transmission of advertisement packets reduces battery usage by the wireless beacon.

In various embodiments, methods of this aspect further comprise receiving a scan request. Optionally, an embodiment further comprises transmitting a scan response, such as a scan response that includes status information associated with the wireless beacon. Optionally, receiving the scan response at a controller facilitates management of the wireless beacon by the controller.

In another aspect, provided are methods for adjusting transmission characteristics of wireless beacons. In embodiments, adjustment of transmission characteristics can allow wireless beacons to be detected at various distance ranges. In embodiments, adjustment of transmission characteristics can change the power used by wireless beacons and/or change a battery life of a wireless beacon. In a specific embodiment, a method of this aspect comprises starting, by a wireless beacon, an advertisement timer; transmitting advertisement packets; starting an announcement timer when the advertisement timer elapses; and transmitting announcement packets until the announcement timer elapses. Optionally, advertisement packets include an advertisement transmission power that is sufficient for the advertisement packets to be detected by wireless devices located inside a target area. Optionally, the advertisement transmission power of the advertisement packets is insufficient for the advertisement packets to be detected by wireless devices located outside the target area. Optionally, announcement packets include a transmission power that is greater than the advertisement transmission power. Optionally, the transmission power of the announcement packets is sufficient for the announcement packets to be detected by wireless devices located outside of the target area. Optionally, receiving transmitted announcement packets at a wireless device facilitates a status identification corresponding to the wireless beacon.

Useful wireless beacons include those compliant with one or more wireless standards. Optionally, the wireless beacon is compliant with a Bluetooth standard, a Bluetooth Smart standard, and/or a Bluetooth v4.0 (or greater) standard.

Optionally, methods of this aspect further comprise resetting the advertisement timer; and repeating the transmitting of advertisement packets. Optionally, methods of this aspect further comprise resetting the announcement timer; and repeating the transmitting of announcement packets. In exemplary embodiments, the advertisement timer has a longer duration than the announcement timer.

In one embodiment, a method of this aspect further comprises receiving a wireless communication providing instructions to change a configuration of the wireless beacon; and changing a configuration of the wireless beacon.

Optionally, the wireless beacon is battery powered. In embodiments, transmission of one advertisement packet uses less battery power than transmission of one announcement packet.

In embodiments, the announcement packets and the advertisement packets are different. For example, in various embodiments, the advertisement packets include information, such as a beacon identifier, a beacon prefix, and/or other beacon information that conform with one or more standards or formats, such as the Apple iBeacon format. In embodiments, an announcement is not detectable as an advertisement packet. For example, an announcement packet may not conform to the same standard or format that an advertisement conforms to. Optionally, an announcement packet may include information, such as identification and/or prefix information to allow the announcement packet to be distinguished from an advertisement packet.

In various embodiments, methods of this aspect further comprise receiving a scan request. Optionally, an embodiment further comprises transmitting a scan response, such as a scan response that includes status information associated with the wireless beacon. Optionally, receiving the scan response at a controller facilitates management of the wireless beacon by the controller.

In another aspect, provided are methods for changing a configuration of a wireless beacon. For example, a specific method embodiment of this aspect comprises establishing, at a wireless beacon, a wireless connection; receiving a first wireless signal including a request for a change in a configuration; determining that the wireless beacon is in a configuration-changes-enabled state; and changing the configuration. Another method embodiment of this aspect comprises establishing, at a wireless beacon, a wireless connection; receiving a first wireless signal including a request for a change in a configuration; determining that the wireless beacon is not in a configuration-changes-enabled state; and refraining from changing the configuration.

In another aspect, provided are methods for controlling access to a wireless beacon. For example, a specific method embodiment of this aspect comprises establishing, at a wireless beacon, a wireless connection; receiving an access code within a timeout period after establishing the wireless connection; and maintaining the wireless connection. Another method embodiment of this aspect comprises establishing, at a wireless beacon, a wireless connection; failing to receive an access code within a timeout period after establishing the wireless connection; and terminating the wireless connection.

In other aspects, systems are provided, such as systems for performing the methods described herein. In exemplary embodiments, a system of this aspect comprises one or more processors, and a non-transitory computer readable storage medium communicatively coupled or otherwise positioned in data communication with the one or more processors. In embodiments, the non-transitory computer readable storage medium includes instructions that, when executed by the one or more hardware processors, cause the one or more hardware processors to perform one or more of the methods described herein.

In other aspects, computer program products are provided, such as computer program products configured to achieve methods described herein. In exemplary embodiments, a computer program product of this aspect is a non-transitory computer readable storage medium comprising instructions that, when executed by one or more hardware processors, cause the one or more hardware processors to perform one or more of the methods described herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures.

DETAILED DESCRIPTION

Figure 1:
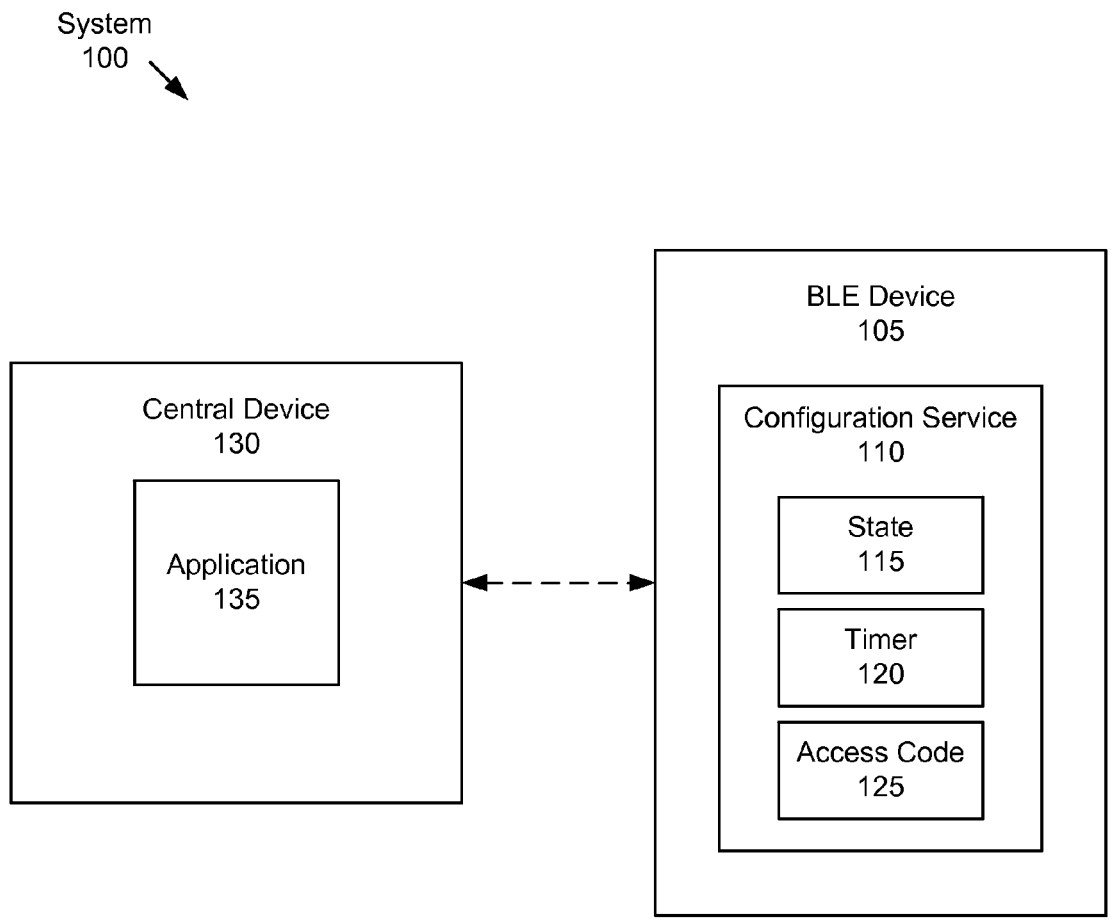
FIG. 1 shows a schematic diagram in accordance with one or more embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

In some aspects, embodiments provide methods, computer readable media and systems for access control in BLUE- TOOTH® Low Energy (BLE) devices (BLUETOOTH is a registered trademark of Bluetooth SIG, Inc., Kirkland, Wash., USA, and is referred to herein as "Bluetooth"). For example, after a Bluetooth connection has been successfully established between two devices, a request for a change in a configuration is received. Subsequently, a determination is made whether the BLE device is in a configuration-changes-enabled state and, if the BLE device is in a configuration-change-enabled state then the configuration is changed per the request. Alternatively, if the BLE device is not in a configuration-change-enabled state then the request is ignored. Optionally, in one or more embodiments, a timer is started upon the establishment of the Bluetooth connection. If the timer expires, the connection is terminated. However, if an access code or other key is received before the timer expires, then the timer may be canceled, thereby allowing the client device to stay connected with the BLE device for a longer period of time.

Throughout this detailed description, reference will be made to the Bluetooth and BLE standards, as well as Bluetooth and/or BLE devices. Bluetooth is a standardized wireless technology for exchanging data over short distances (approximately 330 feet or less). Bluetooth is a widely adopted standard with millions of Bluetooth enabled devices in existence. Bluetooth devices may include, but are not limited to: smartphones, speakers, watches, mice, keyboards, beacons, laptops, desktop computers, tablets, etc.

BLE is, in comparison to Bluetooth, provides reduced power consumption while maintaining a similar communication range. BLE is ideal for devices that are powered by a small battery that may not even be rechargeable. In fact, BLE devices may be able to operate for months or even years on a single button cell, such as a watch battery. BLE devices may even be disposable. However, many more robust devices, such as smartphones (or any of the devices mentioned above when discussing Bluetooth), may be able to use both Bluetooth and BLE. BLE is not backwards compatible with Bluetooth, however, although devices that support both Bluetooth and BLE may use a single radio antenna.

When referring to BLE devices, central device initiates commands and requests, such as smartphone. A peripheral device receives commands and requests and returns responses, such as a beacon. Peripheral devices also can broadcast advertisements, such as signals which announce a peripheral device's presence, but for which no response is expected or, in some configurations, for which no response can be received. A characteristic or status is a data value that is transferred between the peripheral device and the central device, such as battery power. A service is a grouping of related characteristics. Further specific, intricate details of how connections are established between devices, how messages are sent, and other aspects of the BLE standard are widely available in the published literature, and the details of such will not be repeated here.

FIG. 1 shows a system 100 which includes a BLE device 105, a configuration service 110, a state 115, a timer 120, an access code 125, a central device 130, and an application 135. In one or more embodiments, the BLE device 105 may be any device able to communicate using BLE. For example, the BLE device 105 may be, but is not limited to: a beacon, temperature sensor, moisture sensor, disposable device, smartphone, desktop computer, laptop computer, tablet, etc. While not shown in FIG. 1, the BLE device 105 may include many different hardware components such as sensors, circuitry, antennas, batteries, processors, memory, hard drives, etc. As shown in FIG. 1, the BLE device 105 is communicatively connected to a central device 130, for example by way of a Bluetooth connection. Although only one BLE device 105 is shown in FIG. 1, any number of BLE devices may be included in system 100.

In one or more embodiments, a BLE device 105 includes functionality to send advertising packets, establish a Bluetooth connection, make changes to values/configurations, and execute a variety of services (such as the configuration service 110) with various functionalities. The BLE device 105 may send advertising packets according to BLE standard(s) or iBeacon standard in any manner now known or later developed. The advertising packets may, for example, provide data to nearby central devices (such as a smartphone) such as a map, information about an item/place of interest, etc. The advertising packets are typically sent at set intervals, though other configurations may be employed.

In one or more embodiments, the BLE device 105 includes functionality to establish a connection with another device, such as a central device 130, in any manner now known or later developed. When establishing a connection, many different messages may be sent back and forth, and a handshake process may be involved. In one or more embodiments, the BLE device 105 may stop sending advertising packets when a connection is established with another device. Alternatively, the advertising packets may continue to be sent. The BLE device 105 may be able to establish a connection with a single device at a time. In one or more embodiments, due to the increased volume of messages, establishing a connection with a device may rapidly drain the battery of the BLE device 105. By establishing a connection, the connecting device may be able to send messages to, and make changes to the configuration of, the BLE device 105. It will be apparent to one of ordinary skill in the art, having the benefit of this disclosure, that there are many different ways to establish a connection and many different actions may be performed once a connection is established and, as such, the invention should not be limited to the above examples.

In one or more embodiments, the BLE device 105 includes functionality to perform writes and/or change values/characteristics of the BLE device 105 in any manner now known or later developed, such as in accordance with the BLE standards or with other standards. Any value or characteristic may be changed, pursuant to the access controls implemented via the configuration service 110. In one or more embodiments, the BLE device 105 includes functionality to execute services. The services may be of any type now known or later developed. For example, the services may be standardized services, such as the battery service as defined by the BLE standard. Alternatively, the services may be a customer service that may perform any functionality. Alternatively, the services may include reporting a status of the BLE Device 105, such as an operational state, a configuration, a battery level, a timer state, etc. In one or more embodiments, a BLE device 105 includes functionality to execute a configuration service 110.

In one or more embodiments, a configuration service 110 is a custom service for controlling access to the BLE device 105. The configuration service 110 includes any functionality needed for controlling access to the BLE device 105 as described below. In one or more embodiments, the configuration service 110 includes a state 115. In one or more embodiments, the state 115 is an internal state of a BLE device 105 that determines whether a connecting device is able to stay connected for longer than a minimum duration, make changes to the configuration of the BLE device 105, or any other aspect of access control. The state 115 may be set to any number of different settings, and multiple different states may exist within the configuration service 110. In one or more embodiments, a first state 115 is the "access allowed" state. The default value for "access allowed" is initialized to NO—meaning that a connecting device will not be allowed to connect for more than a predetermined amount of time without providing an access code (i.e., access code 125). When any device connects, the value for "access allowed" is reset to NO. When the configuration service 110 receives an access code the value for "access allowed" is changed to YES—thereby allowing the connecting device to stay connected for a longer period of time. In one or more embodiments, the value for "access allowed" may reset after a predetermined amount of time even if an access code has been received. Alternatively, once an access code has been received the value of "access allowed" may not change until the connection is terminated.

In one or more embodiments, a second state 115 may be a "write access allowed" state. The "write access allowed" state must be a YES before any write operations will be accepted (i.e., before any changes may be made to any aspect of BLE device 105). The default value for "write access allowed" is initialized to NO. When any device connects, the value for "write access allowed" is reset to NO. When the configuration service 110 receives an access code (i.e., access code 125) the value for "write access allowed" is changed to YES—thereby allowing the connecting device to perform write actions on the BLE device 105. In one or more embodiments, the value for "write access allowed" may reset after a predetermined amount of time even if an access code has been received. Alternatively, once an access code has been received the value of "write access allowed" may not change until the connection is terminated.

In one or more embodiments, rather than multiple states there may be a single state. In other words, the "access allowed" state and the "write access allowed" state may be combined into a single state which, when set to YES, the connecting device will be allowed to stay connected for longer than a minimum amount of time and perform write actions. It will be apparent to one of ordinary skill in the art, having the benefit of this disclosure, that there may be any number of different states controlling access to a BLE device 105 and, as such, the invention should not be limited to the above examples.

In one or more embodiments, the timer 120 is a timer used by the configuration service 110. There may be any number of timers used by the configuration service 110. For example, a timer 120 may be started upon the successful establishment of a connection with a client device, and another timer may be started upon receiving an access code, performing a write, or any other suitable action. The timer 120 may be set to any suitable amount of time, such as 5 seconds, 10 seconds, 1 minute, 5 minutes, etc. Upon expiration of the timer(s) any suitable action may be performed, such as terminating the connection, changing a state, revoking write access, etc. It will be apparent to one of ordinary skill in the art, having the benefit of this disclosure, that there may be any number of timers and actions taken based on the timers and, as such, the invention should not be limited to the above examples.

In one or more embodiments, an access code 125 is a key that is written to a predetermined characteristic of the configuration service 110 to unlock certain privileges, such as staying connected to a BLE device 105, accessing write authority, etc. There may be any number of different access codes, and each may be of any suitable length. In one or more embodiments, an access code may be written to an "unlock-characteristic" of the configuration service 110, or to any other suitable characteristic. Different access codes may be written to the "unlock-characteristic." For example, a first access code may be written to the "unlock-characteristic" to allow the connection with the BLE device 105 to be maintained for longer than a minimum amount of time, while a second access code may be written to the "unlock-characteristic" to enable writes to be performed on the BLE device 105.

In one or more embodiments, a central device 130 is any device capable of connecting with a BLE device, such as a smartphone, tablet, desktop computer, laptop computer, etc. The central device 130 includes functionality to execute an application 135. In one or more embodiments, the application 135 is an application installed on the central device 130 for interacting with the configuration service 110. The application 135 includes functionality for sending and/or receiving messages from the BLE device 300, or any other functionality needed to implement various embodiments. In one or more embodiments, the application 135 may store the access codes necessary to unlock access to the BLE device 105, such as extending a timer for a connection beyond a minimum amount, performing writes, etc. Upon establishing a connection with a BLE device 105, the application 135 may automatically write the proper access code to the "unlock-characteristic" or may prompt the user to determine whether or not to send the access code 125. It will be apparent to one of ordinary skill in the art, having the benefit of this disclosure, that there are many ways for the client application 135 to interact with the configuration service 110 and, as such, the invention should not be limited to the above examples.

Figure 2:
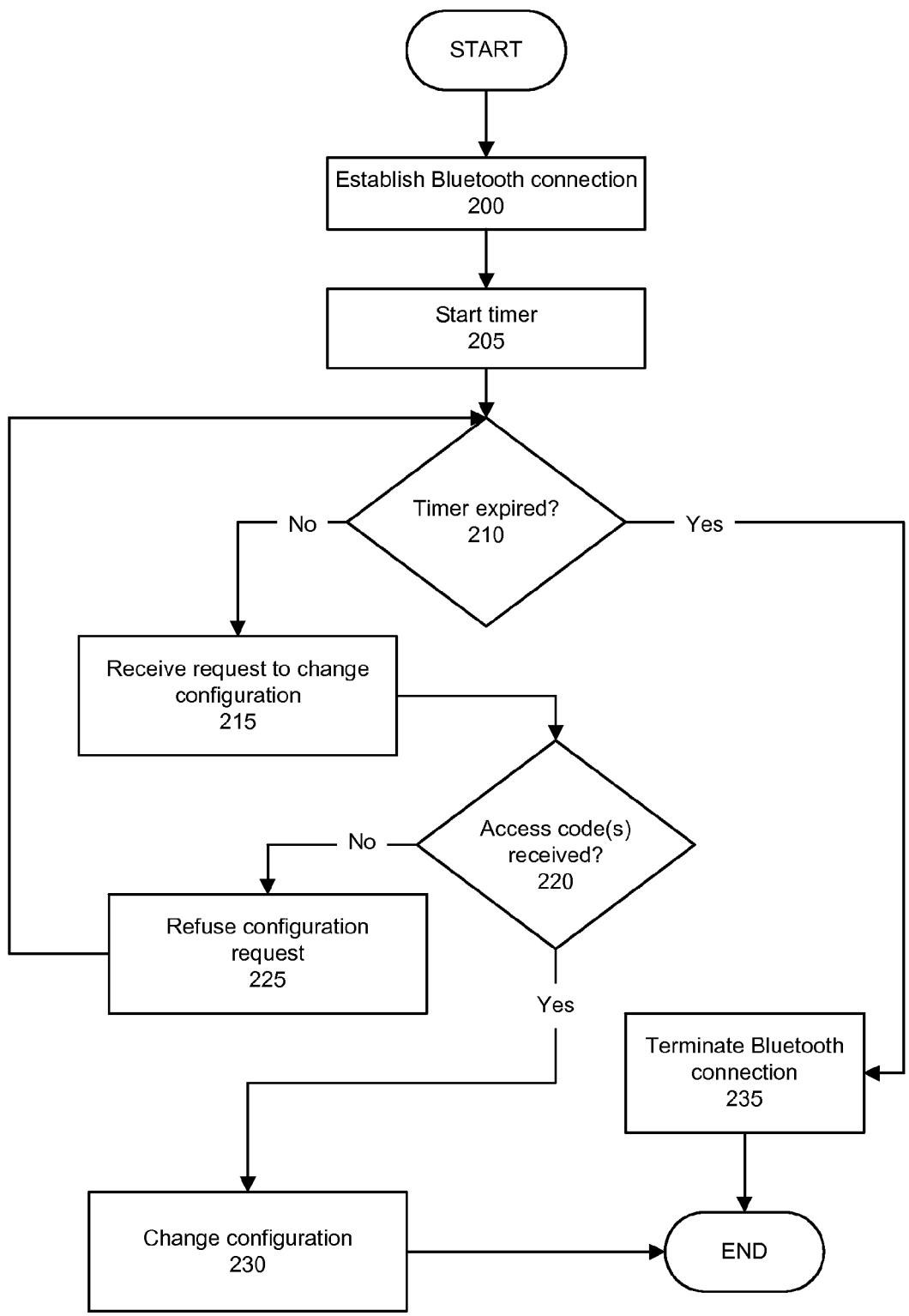
FIG. 2 provides an overview of an exemplary method in accordance with one or more embodiments.

FIG. 2 shows a flowchart of a method for access control in BLE devices. While the various steps in this flowchart are presented and described sequentially, one of ordinary skill in the art will appreciate that some or all of the steps may be executed in different orders and some or all of the steps may be executed in parallel. Further, in one or more embodiments, one or more of the steps described below may be omitted, repeated, and/or performed in a different order. Accordingly, the specific arrangement of steps shown in FIG. 2 should not be construed as limiting the scope of the invention.

At 200, a Bluetooth connection is established, in accordance with one or more embodiments. The Bluetooth connection may be established in any manner now known or later developed, such as using the method(s) identified in the Bluetooth or BLE standard(s). The connection may be between any two devices, such as a smartphone and a beacon.

At 205, a timer is started, in accordance with one or more embodiments. The timer may be started in response to the connection being established. In one or more embodiments, the timer is for limiting the duration that a client device may connect to a BLE device without providing an access code to cancel or extend the timer. The timer may be of any length, such as 10 seconds, 30 seconds, 2 minutes, etc.

At 210, a determination is made whether the timer is expired, in accordance with one or more embodiments. If the timer is expired the method proceeds to 235. If the timer is not expired the method proceeds to 215.

At 215, a request to change configuration is received, in accordance with one or more embodiments. The request may be received in any manner now known or later developed. The request may be to change any aspect, characteristic, or other item within the BLE device.

At 220, a determination is made whether an access code(s) has been received, in accordance with one or more embodiments. The access code(s) may be received from the connected client device, and may be received in any manner now known or later developed. In one or more embodiments, the access code(s) is written to an "unlock-characteristic" of a configuration service of the BLE device. In response to receiving an access code, any suitable action may be performed, such as canceling or extending a timer, changing a state (e.g., from write disabled to write enabled, etc.), etc. In one or more embodiments, multiple access codes may be needed to fully access the configuration of the BLE device. For example, a first access code may be needed to stop the timer and a second access code may be needed to enable write access. If the access code(s) has been received the method proceeds to 230. If the access code(s) has not been received the method proceeds to 225.

At 225, the configuration request is refused, in accordance with one or more embodiments. The configuration request may be refused in any manner now known or later developed, such as simply ignoring the request. The client device may not receive a message indicating that the request was ignored. Alternatively, the client device may receive a message indicating that the request was ignored. After 225, the method returns to 210. Optionally, in response to ignoring the request, the method may proceed to 235 and terminate the Bluetooth connection.

At 230, the configuration is changed, in accordance with one or more embodiments. The configuration may be changed in any manner now known or later developed, such as the methods identified in the BLE standard.

At 235, the Bluetooth connection is terminated, in accordance with one or more embodiments. The connection may be terminated in any manner now known or later developed, such as the methods identified in the BLE standard.

The following section describes various exemplary embodiments. The examples described are included to aid in the understanding of aspects of the invention and are not intended to limit the scope of the invention.

Figure 3A:
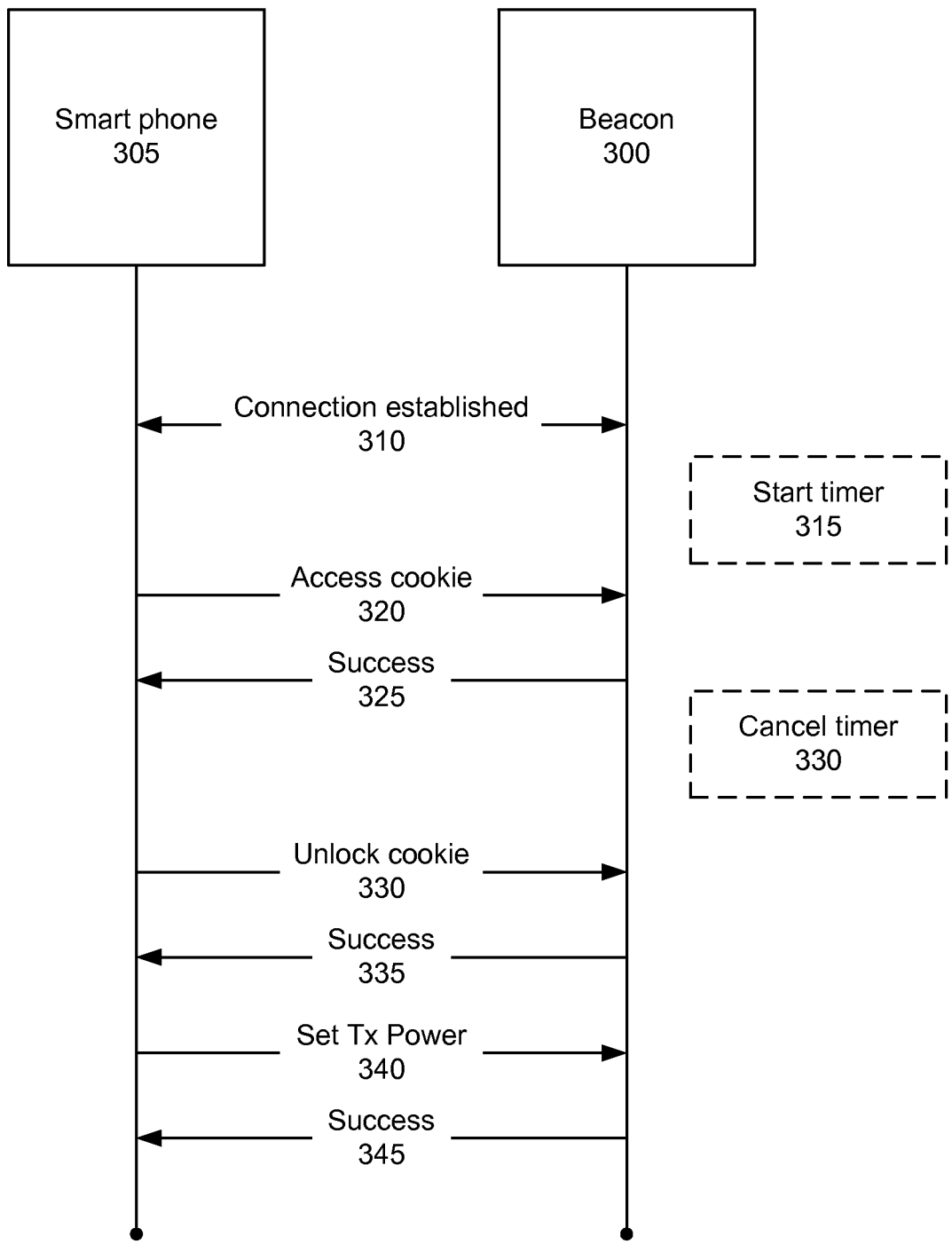
FIG. 3A, FIG. 3B and FIG. 3C show examples in accordance with one or more embodiments.
Figure 3B:
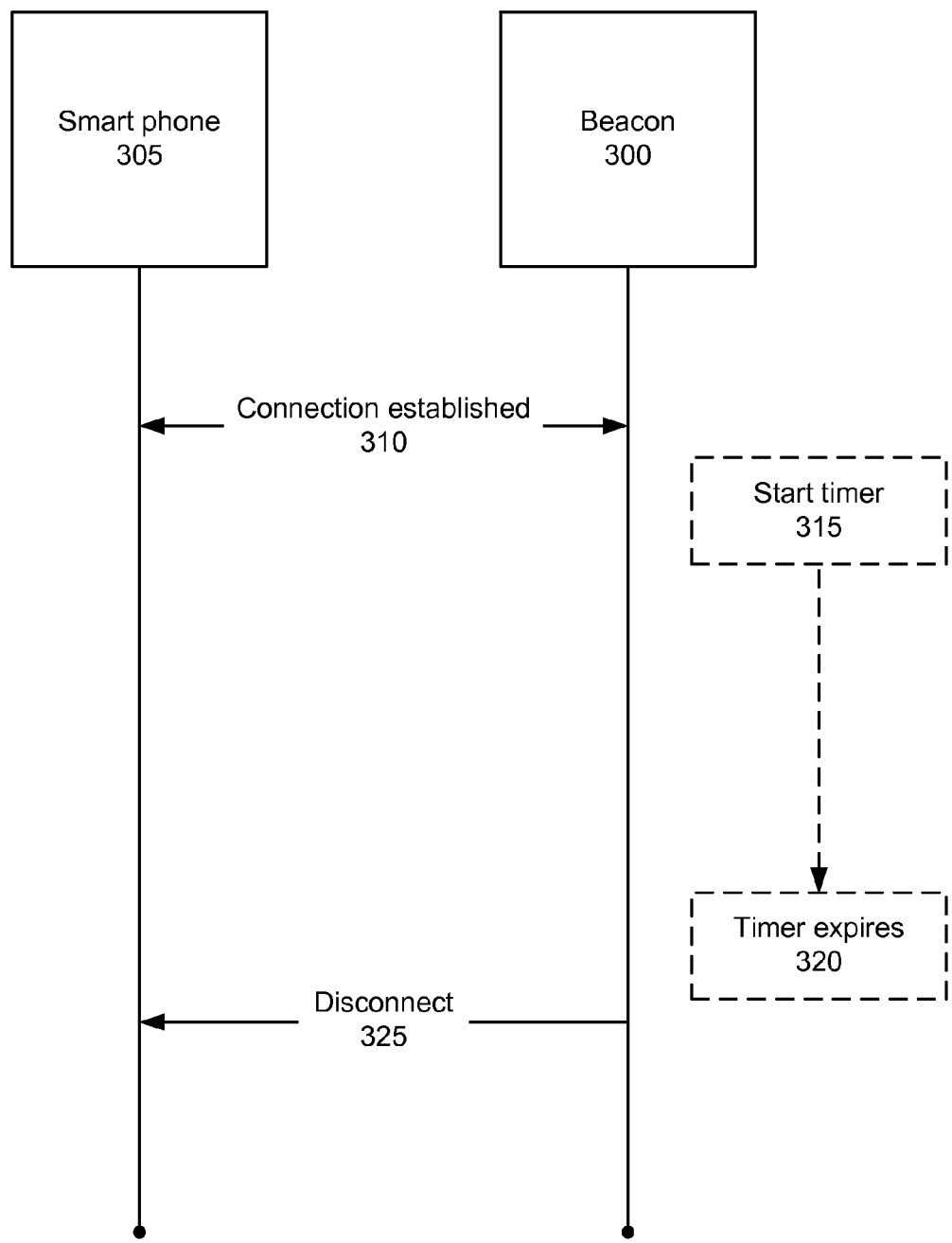
Figure 3C:
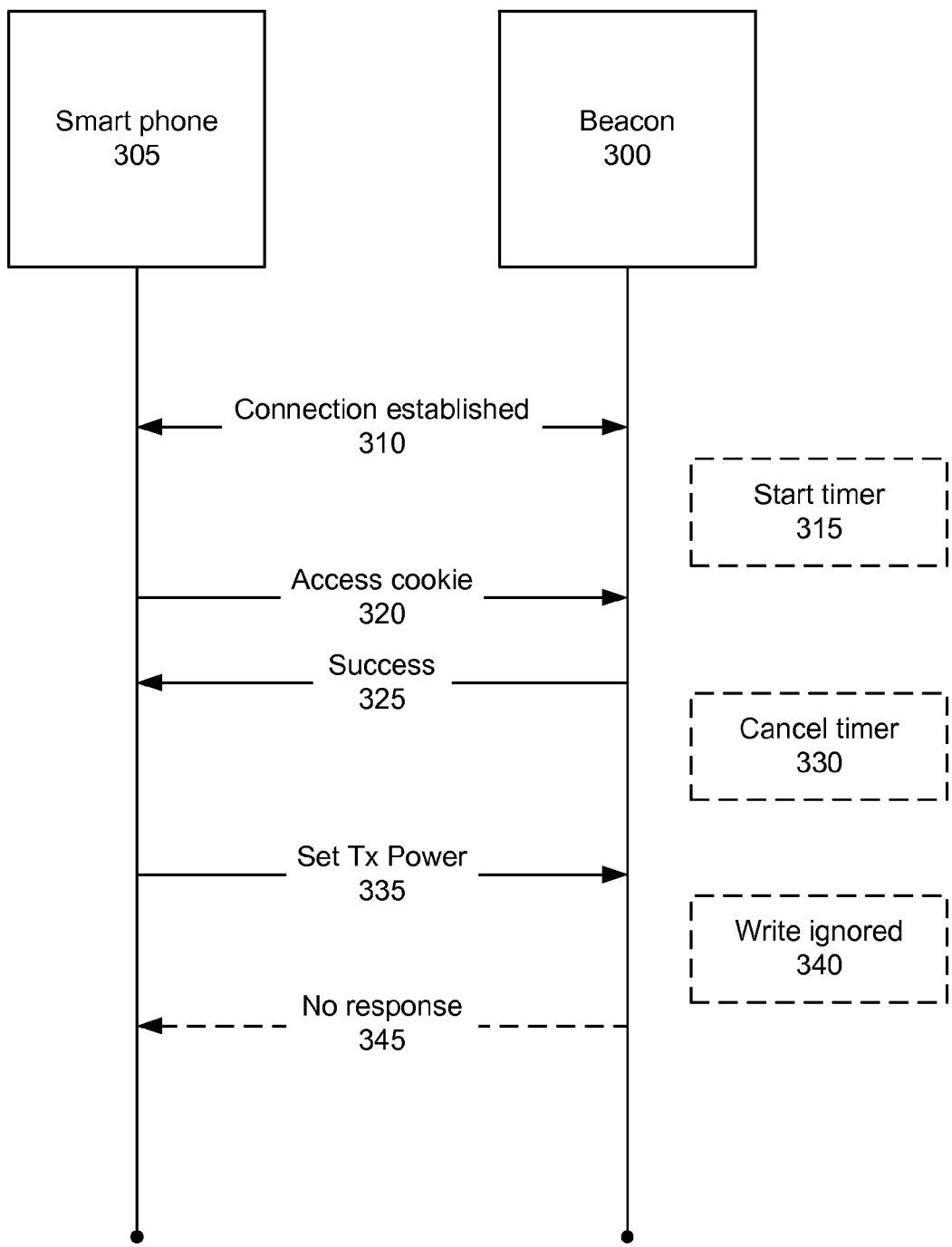

FIGS. 3A, 3B, and 3C show examples in accordance with one or more embodiments. In FIG. 3A, the example depicts the steps of successfully setting the transmission power (Tx Power) of a beacon 300. In this example, the beacon 300 is, for example, placed behind a display that provides information about the display to nearby devices. Initially, at 310, a connection is established between a smart phone 305 and the beacon 300. After the connection is established, beacon 300 starts a timer 315. The timer 315 is short, only 10 seconds long, and the smart phone 305 needs to provide an access code before the timer expires. Thus, the smart phone 305 provides an access cookie 320 to beacon 300 prior to the timer expiring. The access cookie 320 is written to the "unlock-characteristic" of the beacon 300, and the state of beacon 300 is changed to allow a connection to persist longer than 10 seconds. The access cookie 320 cancels the timer 330, and the beacon 300 notifies the smart phone 305 that the access cookie 320 was successfully received, at 325. Subsequently, the smart phone 305 sends an unlock cookie 330 to beacon 300, so that write access will be granted. The unlock cookie 330 is also written to the "unlock-characteristic" of the beacon 300, and the state of beacon 300 is changed to a configuration-change-enabled state. The beacon 300 responds that the unlock cookie 330 was a success, at 335, and the smart phone 305 has now been granted the authority to write changes to the configuration and settings of beacon 300. Thus, smart phone 305 then sends a message to set "Tx Power" 340 of beacon 300 to a desired level. After checking to ensure that beacon 300 is in the configuration-change-enabled state, beacon 300 makes the desired changes to "Tx Power," and respond to smart phone 305 that the configuration changes was a success, at 345.

FIG. 3B shows an example of a timer expiring due to not receiving an access code. As in FIG. 3A, a connection is established, at 310, between smart phone 305 and beacon 300, at which point a timer is started 315. The timer in this example is also short—15 seconds. However, as the timer counts down no access code is written to the unlock characteristic of beacon 300. Thus, the timer expires 320 and in response to the expiration the beacon 300 disconnects the smart phone 305, at 325. This timer ensures that no one device may unnecessarily occupy the connection of the beacon, and limits the battery usage, as maintaining a connection is highly draining on the battery.

FIG. 3C shows an example of ignoring a configuration request. As in FIGS. 3A and 3B, initially a connection is established, at 310, between smart phone 305 and beacon 300, and the timer 315 is started. Again the timer is short—5 seconds. However, access cookie 320 is written to the unlock characteristic of beacon 300 before the expiration of the timer, and thus beacon 300 cancels the timer, at 330, and sends a notification that the access cookie was successful, at 325. Subsequently, smart phone 305 sends a request to set "Tx Power" 335. However, an access code has not been received by beacon 300 and thus the beacon is not in a configuration-changes-enabled state and the write is ignored, at 340. No response 345 is sent by beacon 300 notifying smart phone 305 of the failure to change the configuration setting.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments.

Figure 4:
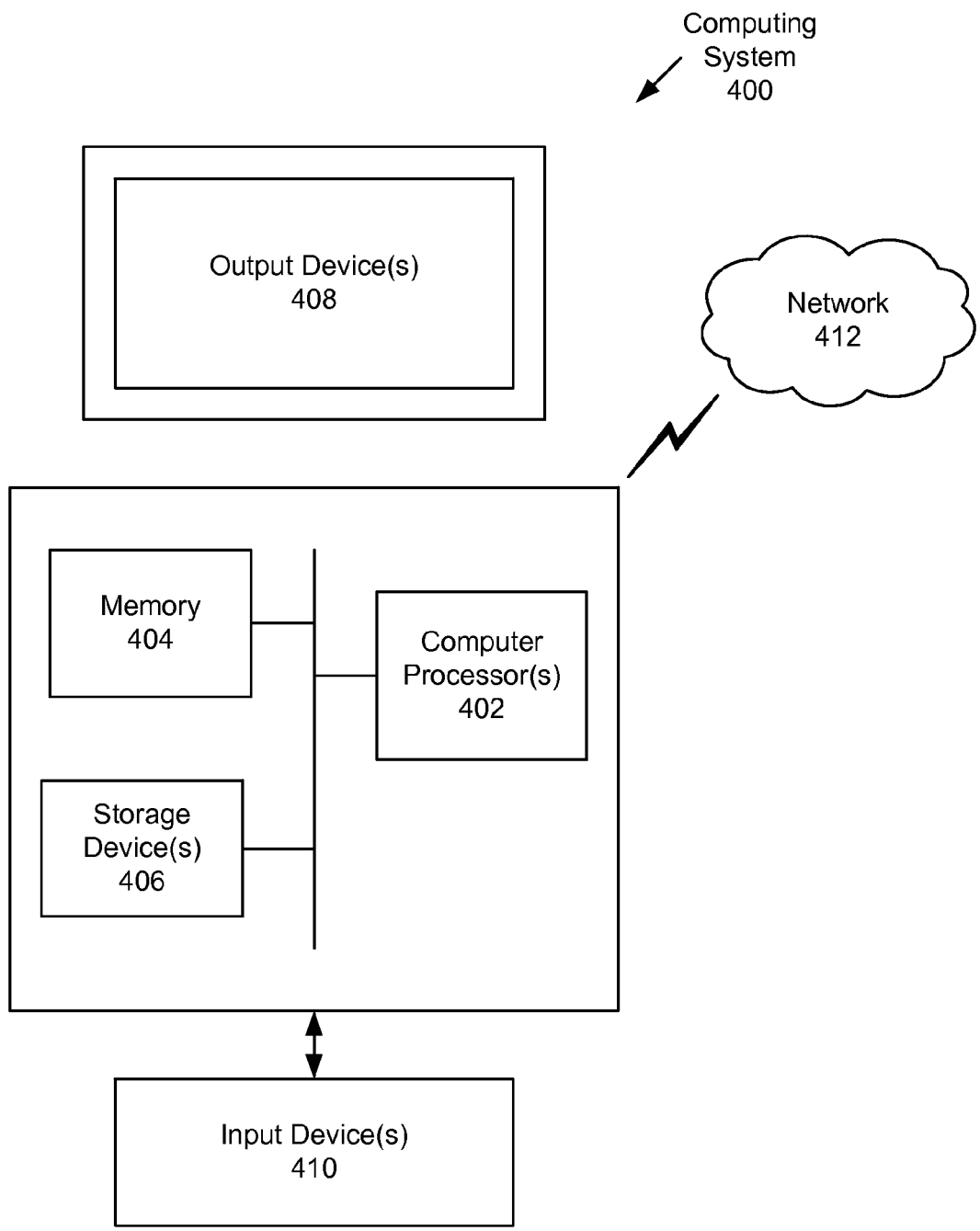
FIG. 4 shows a computer system in accordance with one or more embodiments.

For example, as shown in FIG. 4, the computing system 400 may include one or more computer processor(s) 402, associated memory 404 (e.g., random access memory (RAM), cache memory, flash memory, etc.), one or more storage device(s) 406 (e.g., a hard disk, an optical drive such as a compact disk (CD) drive or digital versatile disk (DVD) drive, a flash memory stick, etc.), and numerous other elements and functionalities. The computer processor(s) 402 may be an integrated circuit for processing instructions. For example, the computer processor(s) may be one or more cores, or micro-cores of a processor. The computing system 400 may also include one or more input device(s) 410, such as a touchscreen, keyboard, mouse, microphone, touchpad, electronic pen, or any other type of input device. Further, the computing system 400 may include one or more output device(s) 408, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 400 may be connected to a network 412 (e.g., a local area network (LAN), a wide area network (WAN) such as the Internet, mobile network, or any other type of network) via a network interface connection (not shown). The input and output device(s) may be locally or remotely (e.g., via the network 412) connected to the computer processor(s) 402, memory 404, and storage device(s) 406. Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system 400 may be located at a remote location and connected to the other elements over a network 412. Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

Figure 5:
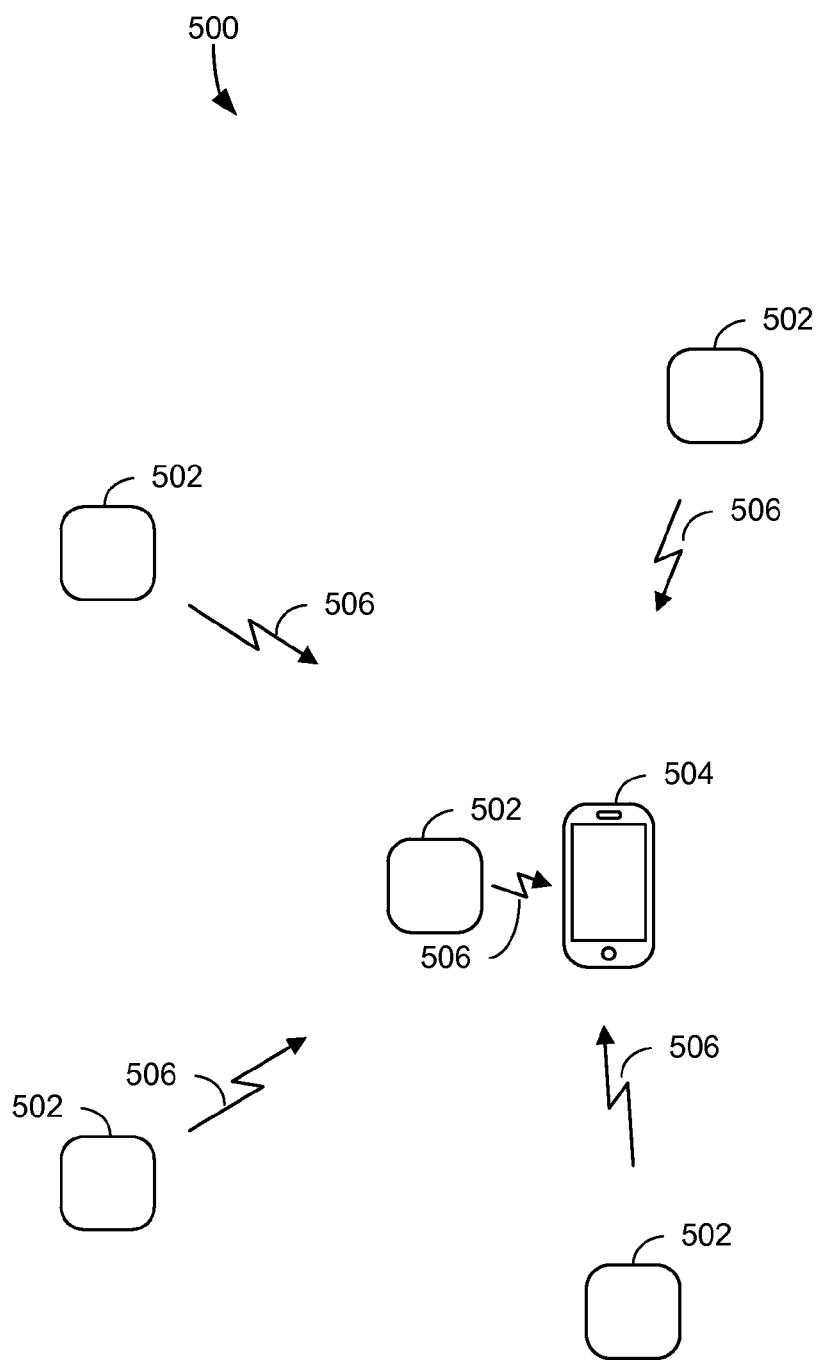
FIG. 5 provides an illustration of an example wireless communications environment, in accordance with some embodiments.

In various embodiments, multiple wireless beacons are employed, such as to allow for location tracking by a central device. FIG. 5 illustrates an example wireless communications environment 500 including 5 peripheral devices, exemplified as BLE beacons 502 and a central device, exemplified as a smartphone 504. Each BLE beacon 502 is configured to transmit wireless advertisement packets 506, such that smartphone 504 can receive the advertisement packets 506 from any and/or all of the BLE beacons 502, depending on the location of the smartphone 504 relative to the BLE beacons 502. As will be understood by the skilled artisan, beacons 502 transmit advertisement packets 506 regardless of whether there is any other device in the vicinity of beacon 502. In this way, beacons 502 are broadcasting an advertisement of their presence in the environment, such that any passing device capable of receiving the broadcast can do so.

Figure 6:
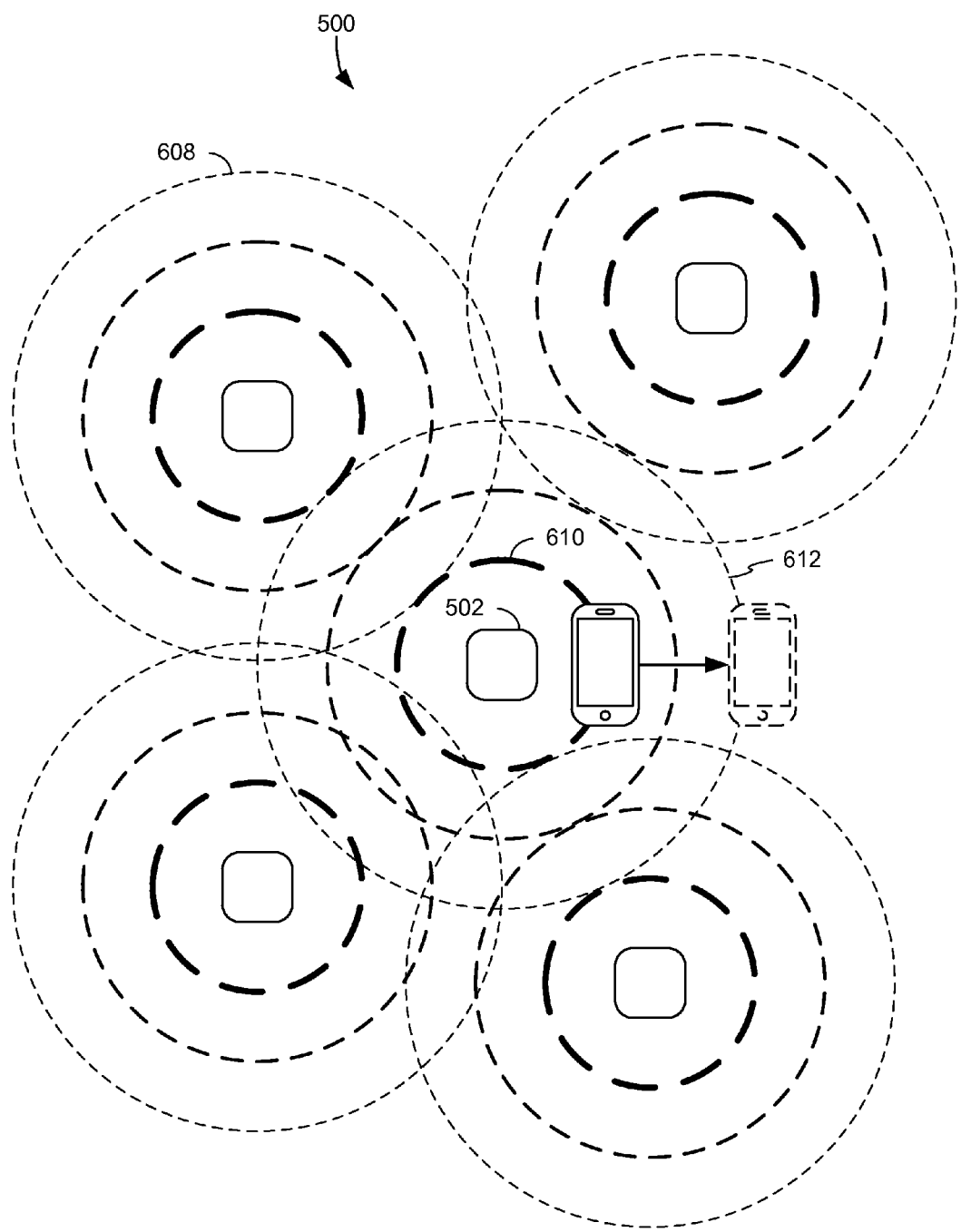
FIG. 6 provides an illustration of an example wireless communications environment, in accordance with some embodiments.

FIG. 6 provides another schematic illustration of the wireless communications environment 500, again including 5 BLE beacons 502 and a smartphone 504. Signal strength indicators 608 schematically illustrate a detectable range of the advertisement packets broadcast by BLE beacons 502, and schematically depict that, at a distance 610 close to beacon 502, the received signal strength would be higher than at a far distance 612 from a beacon 502. Smartphone 504 is further depicted as travelling away from beacon 502, during which time, received signal strengths of advertisement packets would reduce.

Figure 7A:
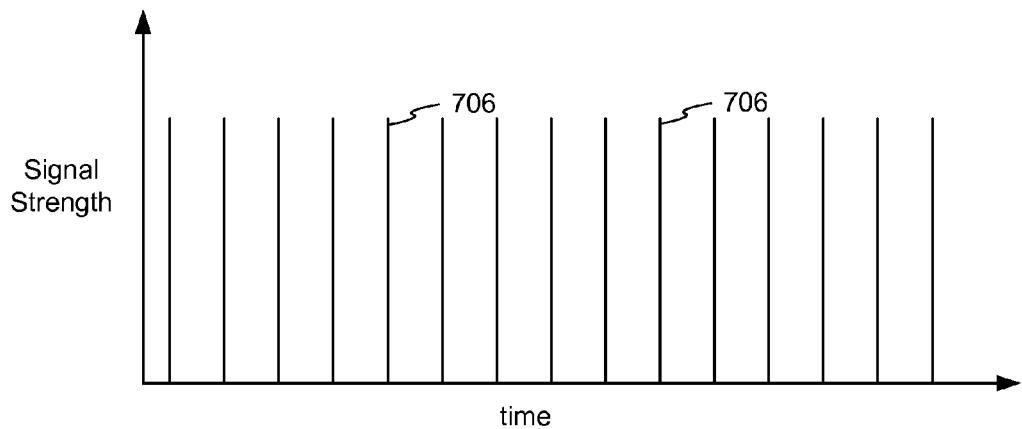
FIG. 7A and FIG. 7B provides schematic illustration of plots of detected signal strength as a function of time.
Figure 7B:
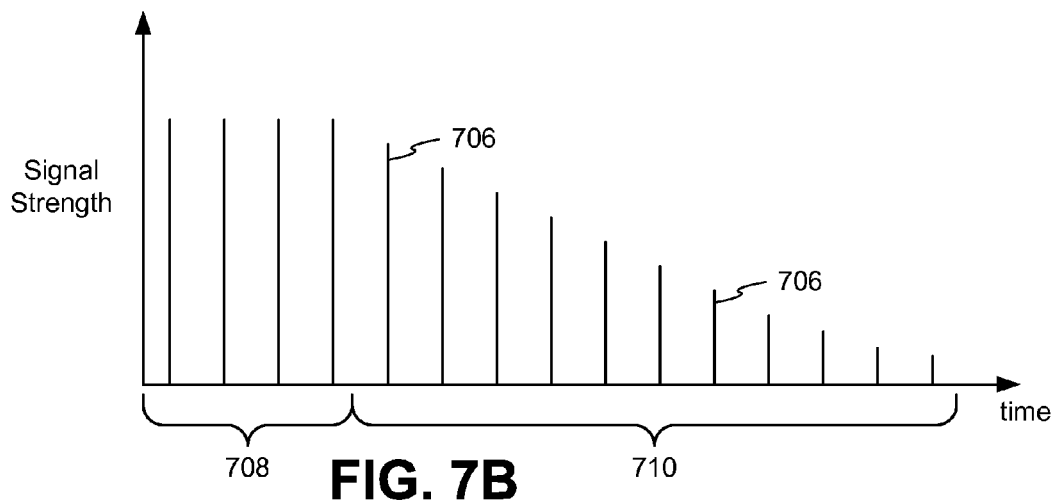
Figure 7C:
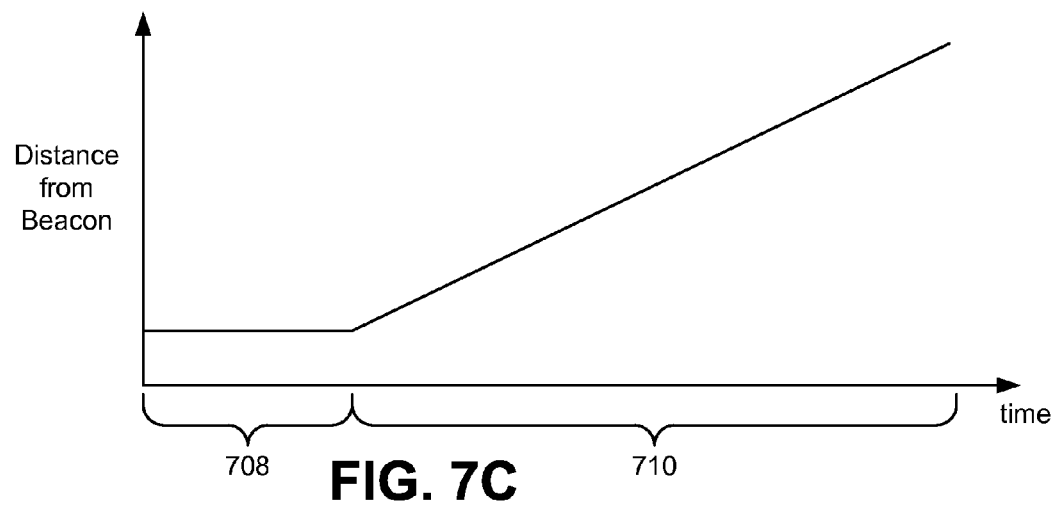
FIG. 7C provides a schematic illustration of a plot of distance from a beacon as a function of time.

FIG. 7A depicts a schematic plot showing the timing and received signal strength of advertisement packets 706 at smartphone 504 while stationary. Multiple advertisement packets 706 are detected, each with approximately the same signal strength. FIG. 7B depicts a schematic illustration showing timing and received signal strength of advertisement packets 706 at smartphone 504 while stationary, during time period 708, and while travelling away from beacon 502, during time period 710. Multiple advertisement packets 706 received show a reduction in received signal strength while the smartphone 504 is travelling away from beacon 502. FIG. 7C depicts a schematic illustration showing the relative position of smartphone 504 from beacon 502 during time period 708 and time period 710.

Figure 8:
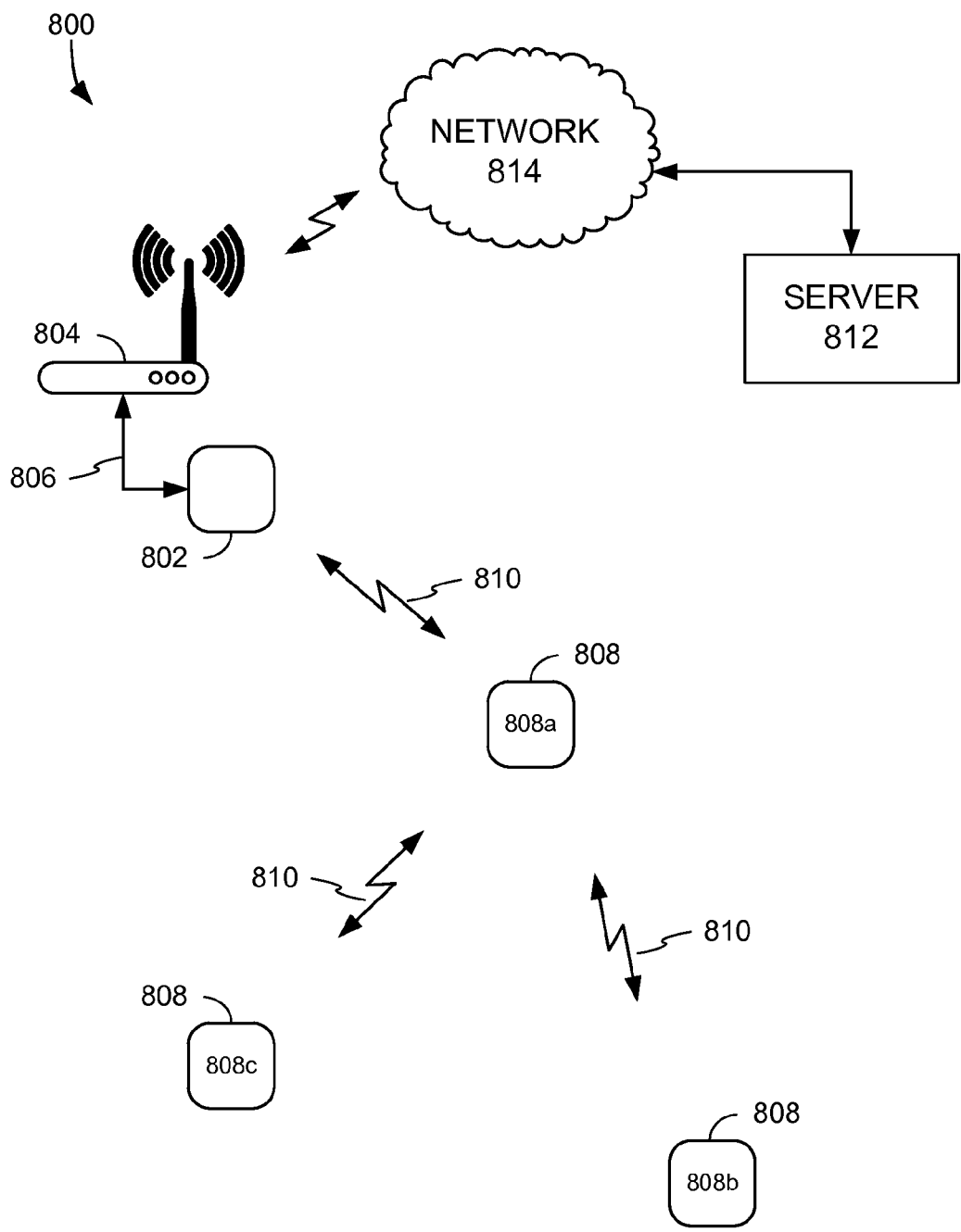
FIG. 8 provides an illustration of an example wireless communications environment, in accordance with some embodiments.

FIG. 8 provides a schematic illustration of a wireless communications environment 800, showing a beacon 802 in data communication with a wireless network access point 804 over wired connection 806. Although illustrated as a wired connection 806, embodiments are contemplated where beacon 802 connects to access point 804 wirelessly, for example, by way of a Bluetooth connection, such as when access point 804 includes appropriate hardware like a Bluetooth wireless transceiver and antenna. Attaching beacon 802 over wired connection 806 can simplify the construction of access point 804 and allow beacon 802 to draw power from access point 804 over wired connection 806. For example, wired connection 806 may be a Universal Serial Bus (USB) connection, which can provide both power to beacon 802 and allow for information exchange between beacon 802 and access point 804.

Other beacons 808a, 808b, and 808c (collectively beacons 808) are present in the environment 800 and the beacons can exchange data with one another over wireless links 810. As illustrated, beacons 808 are battery powered beacons. Such a configuration advantageously allows beacon 802 to receive information, such as instructions, configuration and/or status changes, etc., from access point 804, or also from server 812, which connects to access point through network 814. Optionally, instructions, configuration and/or status changes are provided by a controller, such as a controller that manages one or more beacons. In embodiments, a controller is included as a component, subroutine, and/or state machine within access point 804 or server 812. Access point 804 can connect to network 814 over one or more wired or wireless links. Further, the instructions, configuration and/or status changes, etc., received at beacon 802 can be relayed to beacons 808 over wireless links 810. In this way, server 812 can be used to centrally manage a plurality of battery powered beacons 808 using an access point that includes a data connection to beacon 802. Although the embodiment illustrated in FIG. 8 depicts beacon 802 as a separate device from access point 804, embodiments are contemplated where the access point 804 includes a separate transceiver for allowing communication with beacons 808 over a wireless link 810 established directly between access point 804 and beacons 808.

As illustrated in FIG. 8, beacon 802 may only be in a position where it can communicate with a subset of the battery powered beacons 808. For example, beacon 802 may only be at a position where it can establish a wireless link 810 with a single beacon, such as the beacon 808a in FIG. 8. Beacon 808a, however, may be able to communicate with other beacons present in the environment, such as beacon 808b and beacon 808c, which may or may not be able to communicate with one another. Beacon 808a can act as a relay, forwarding or repeating the communications from beacon 802 so that beacons 808b and 808c can receive the information. In some embodiments, a beacon is configured to automatically repeat incoming instructions received in order to relay the instructions to neighboring beacons. In some embodiments, beacons 808 and 802 form a mesh wireless network to allow communications to be exchanged among beacons 808 and 802 and further to allow communications to be directed to access point 804, network 814 and server 812. In various embodiments, server 812 can direct communications to individual beacons by including an identifier with the communications, such as using one or more of a Media Access Control (MAC) address, a Universally Unique Identifier (UUID), and other sub-identifiers, such as a Major value and a Minor value.

Optionally, instructions can be generated by server 812 to change a state of one or more of beacons 802 and 808. Optionally, instructions can be received by way of access point 804 and beacon 802. Optionally, instructions can be generated and or received by way of another network device present in environment 800, such as a smartphone, tablet or other device including appropriate hardware to communicate with beacons 808. For example, server 812 can transmit instructions to beacons 808 to transition to power saving modes, such as states where the transmission frequency of advertisement packets is reduced or where the transmission of advertisement packets is halted.

Figure 9:
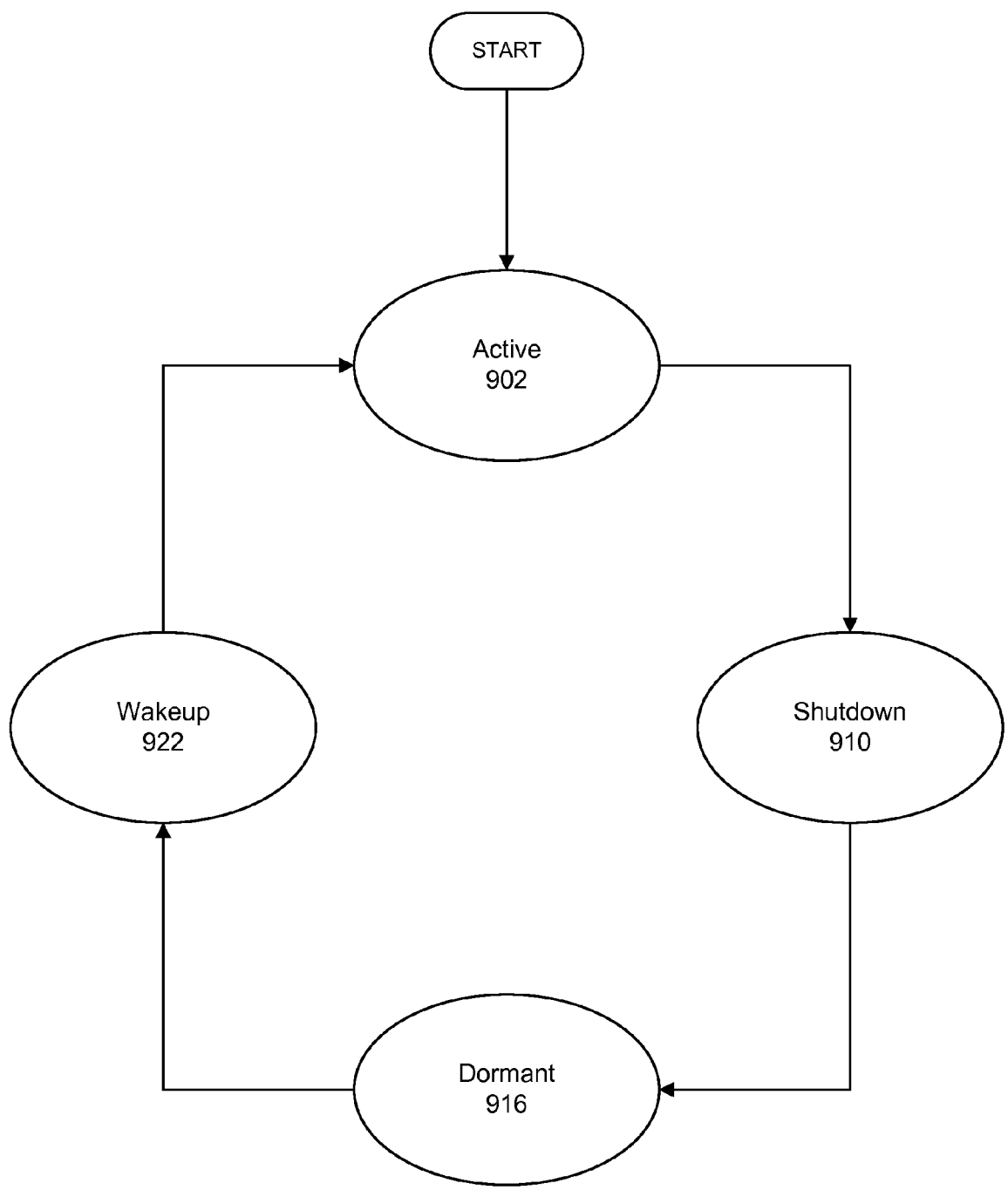
FIG. 9 provides an overview of an exemplary method in accordance with one or more embodiments.
Figure 10:
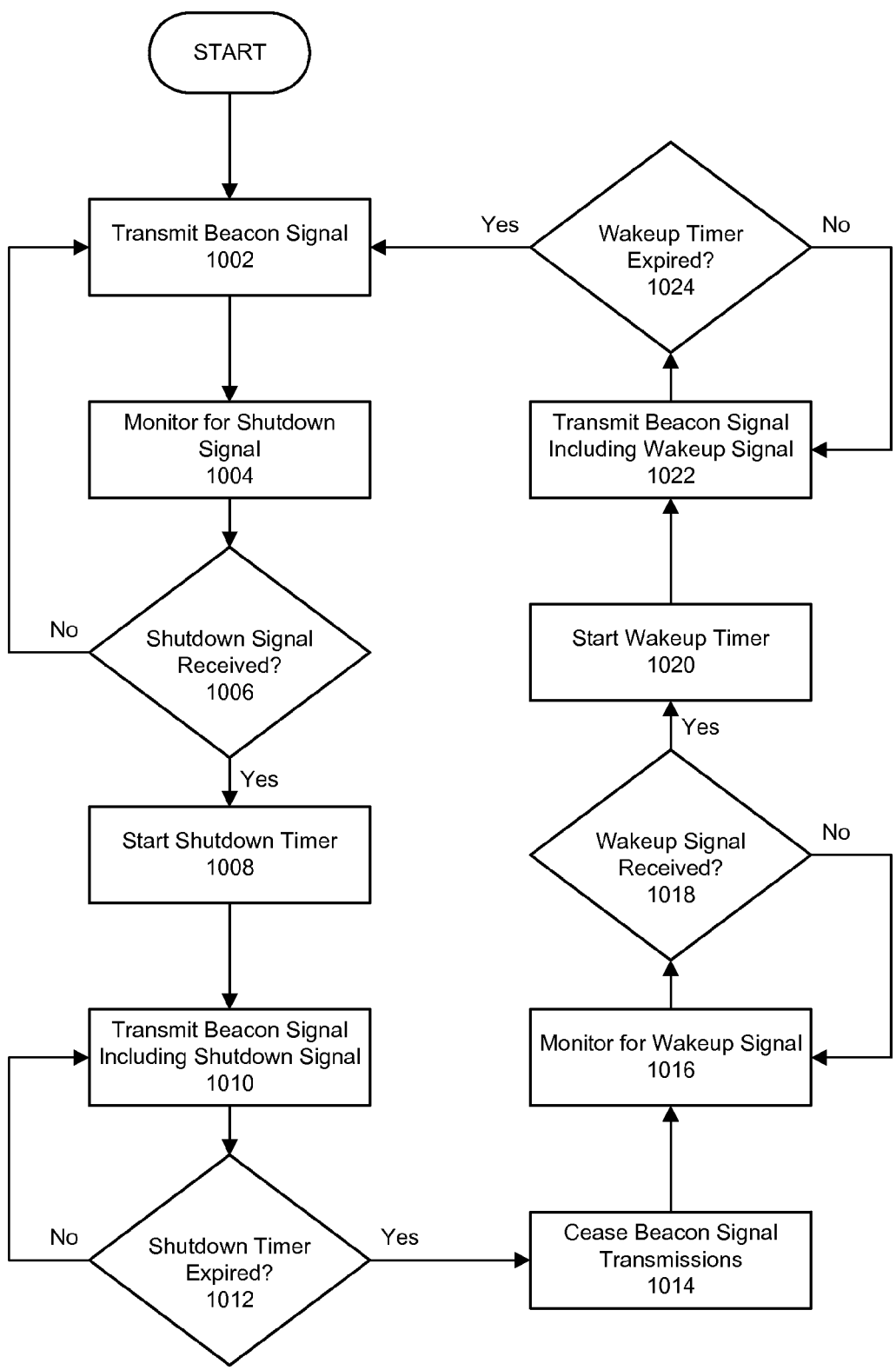
FIG. 10 provides an overview of an exemplary method in accordance with one or more embodiments.

FIGS. 9 and 10 provides overviews of exemplary methods for cycling wireless beacons through various states. Generally, a beacon, when first powered on will enter active state 902. Embodiments are contemplated, however, where a beacon will enter another state upon being powered on. In the active state 902, a beacon will operate as a normal beacon and broadcast advertisement packets, such as according to a stored configuration. In other words, a beacon will transmit beacon signals, at 1002. During active state 902, a beacon may listen for instructions and configuration requests, such as status requests or other configuration changes, for example advertisement transmission power and frequency settings. In an exemplary embodiment, a beacon in the active state 902 listens for a wireless transmission including a beacon shutdown signal, such as a beacon shutdown signal that includes instructions that trigger the beacon to transition to a dormant state. In other words, a beacon will monitor for a shutdown signal, at 1004. Although shown in FIG. 10 as monitoring for shutdown signals, at 1004, each time after a beacon signal is transmitted, at 1002, embodiments are contemplated where a beacon monitors for a shutdown signal before transmitting a beacon signal or where a beacon only periodically monitors for shutdown signal (i.e., not before/after each and every beacon signal is transmitted). In various embodiments, the shutdown transmission is generated by a peripheral device, such as a beacon, or by a central device, such as a smartphone. Optionally, the shutdown transmission is generated by a wireless access point, such as a wireless access point that includes appropriate hardware and software/firmware to communicate with wireless beacons, for example Bluetooth low energy beacons.

When a shutdown signal is received, at 1006, such as by receiving a shutdown transmission that includes a beacon shutdown signal, a beacon will transition to shutdown state 910. In various embodiments, a beacon will remain in the shutdown state 910 for a specified amount of time, such as until a timer, started at 1008, expires. During shutdown state 910, a beacon will transmit wireless shutdown packets, such as a shutdown packet that includes a beacon shutdown signals. In other words, a beacon will transmit beacon signals including shutdown signals, at 1010. In this way, before transitioning to dormant state 916, a beacon in the shutdown state 910 will alert neighboring beacons of the instructions received to transition to dormant states. In various embodiments, a beacon in the shutdown state will repeatedly transmit wireless shutdown packets. Optionally, a beacon in the shutdown state 910 will reduce or otherwise cease the transmission of advertisement packets. Optionally, a beacon in shutdown state 910 will not alter the transmissions of advertisement packets used in the active state 902.

After the shutdown state 910, such as upon determining that a shutdown timer has expired, at 1012, a beacon will transition to dormant state 916. While in dormant state 916, a beacon will reduce the frequency at which it transmits advertisement packets. In some embodiments, such as at 1014, a beacon will cease transmission of beacon signals. In embodiments, a beacon in the dormant state 916 will reduce its power consumption as compared to operation in the active state 902. While in dormant state 916, a beacon will also monitor for wireless transmissions including beacon wakeup signals, such as a beacon wakeup signal that includes instructions that trigger the beacon to transition to an active state. In other words, a beacon will monitor for a wakeup signal, at 1016.

When a wakeup signal is received, at 1018, such as by receiving a wakeup transmission that includes a beacon wakeup signal, a beacon will transition to wakeup state 922. In various embodiments, a beacon will remain in the wakeup state 922 for a specified amount of time, such as until a timer, started at 1020, expires. During wakeup state 922, a beacon will transmit wireless wakeup packets, such as a wakeup packet that includes a beacon wakeup signals. In other words, a beacon will transmit beacon signals including wakeup signals, at 1022. In this way, before transitioning back to active state 902, a beacon in the wakeup state 922 will alert neighboring beacons of the instructions received to transition to active states. In various embodiments, a beacon in the wakeup state will repeatedly transmit wireless wakeup packets. Optionally, a beacon in the wakeup state 922 will begin transmission of or increase the frequency at which it transmits advertisement packets. Optionally, a beacon in wakeup state 922 will not alter the transmissions of advertisement packets used in the dormant state 916. After the wakeup state 922, such as upon determining that a wakeup timer has expired, at 1024, a beacon will transition to active state 902, such as for the transmission of beacon signals, at 1002.

Figure 11A:
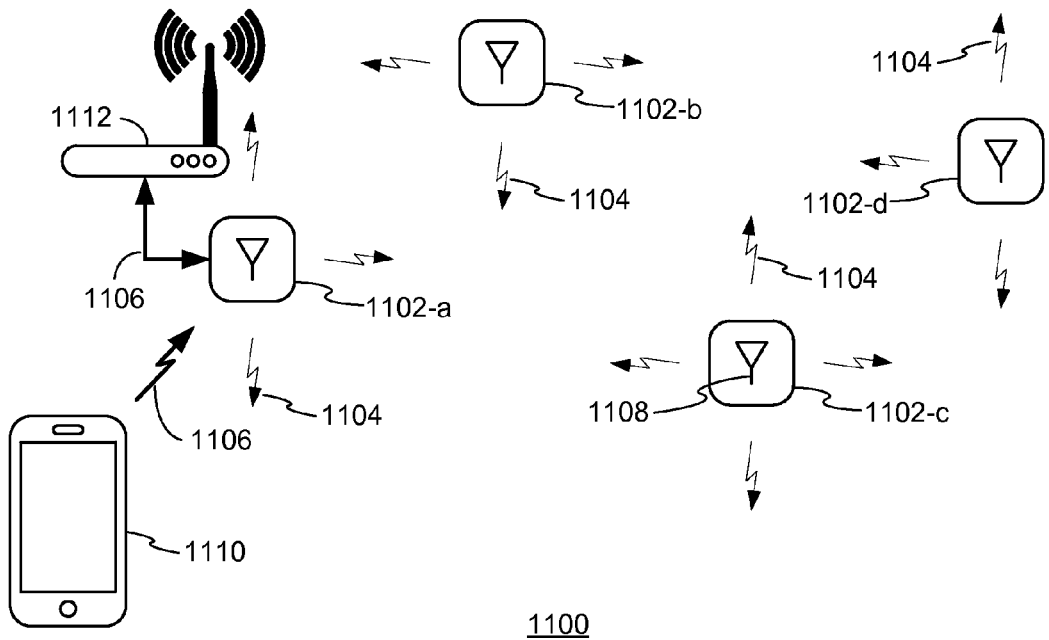
FIG. 11A, FIG. 11B, FIG. 11C, FIG. 11D, FIG. 11E, FIG. 11F, FIG. 11G, FIG. 11H, FIG. 11I, FIG. 11J, FIG. 11K and FIG. 11L provide illustrations of example wireless communications environments, in accordance with some embodiments.
Figure 11B:
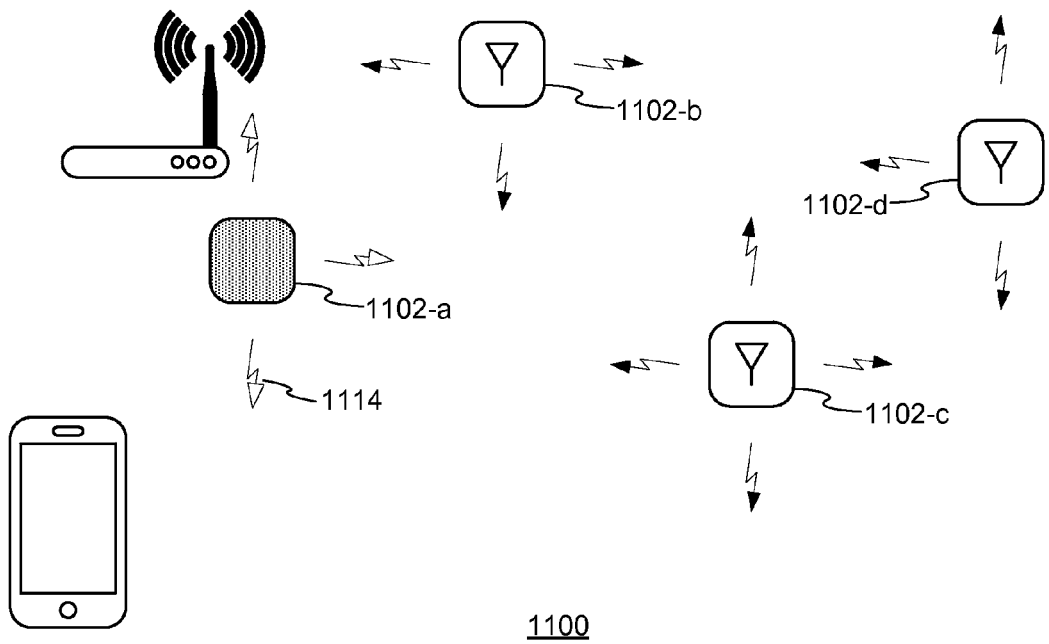

To further illustrate this technique, FIGS. 11A-11L depict a wireless communications environment 1100 showing wireless beacons cycling through various states. Initially, as shown in FIG. 11A, a plurality of wireless beacons 1102-*a*, 1102-*b*, 1102-*c* and 1102-*d* (collectively beacons 1102) are in the active state. Here, beacons 1102 transmit wireless advertisements 1104. In addition, beacons 1102 are monitoring for shutdown signals 1106, schematically illustrated by antennae 1108. Upon receiving a shutdown signal 1106, beacon 1102-*a* will transition to the shutdown state, as illustrated in FIG. 11B. In various embodiments, shutdown signal 1106 is received from smartphone 1110 or wireless access point 1112.

Although illustrated in FIG. 11A as being transmitted to only a single beacon, beacon 1102-*a*, a single shutdown signal may be received at multiple beacons. Beacon 1102-*a* may be the only beacon that receives the shutdown signal 1106 due to the smartphone 1110 or access point 1112 being too distant from other beacons 1102-*b*, 1102-*c* and 1102-*d* for these beacons to receive the shutdown signal 1106.

Advantageously, beacon 1102-*a* enters the shutdown state after receiving shutdown signal 1106, as shown in FIG. 11B. While in the shutdown state, beacon 1102-*a* transmits wireless shutdown packets 1114 that include a shutdown signal and, because they are still in the active state, beacons 1102-*b*, 1102-*c* and 1102-*d* continue to monitor for shutdown signals. As illustrated, beacons 1102-*b* and 1102-*c* are within a detection range of beacon 1102-*a* and so receive the transmitted wireless shutdown packets 1114.

Figure 11C:
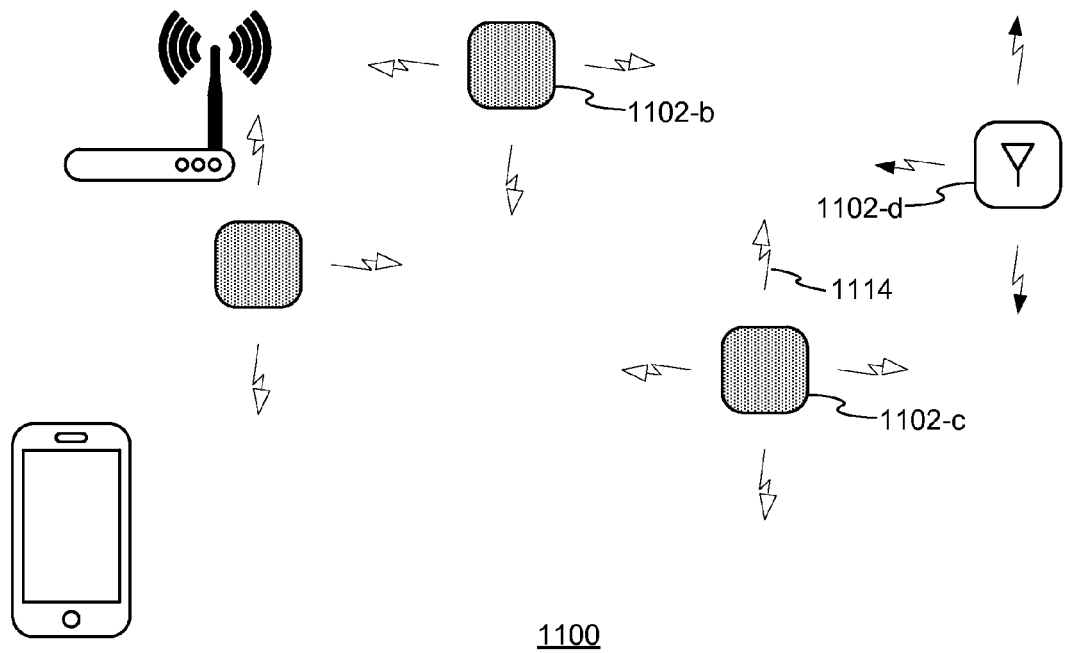

Upon receiving a wireless shutdown packet, beacons 1102-*b* and 1102-*c* transition to the shutdown state, as illustrated FIG. 11C, and begin transmitting wireless shutdown packets 1114, which may be received by beacon 1102-*d*.

Figure 11D:
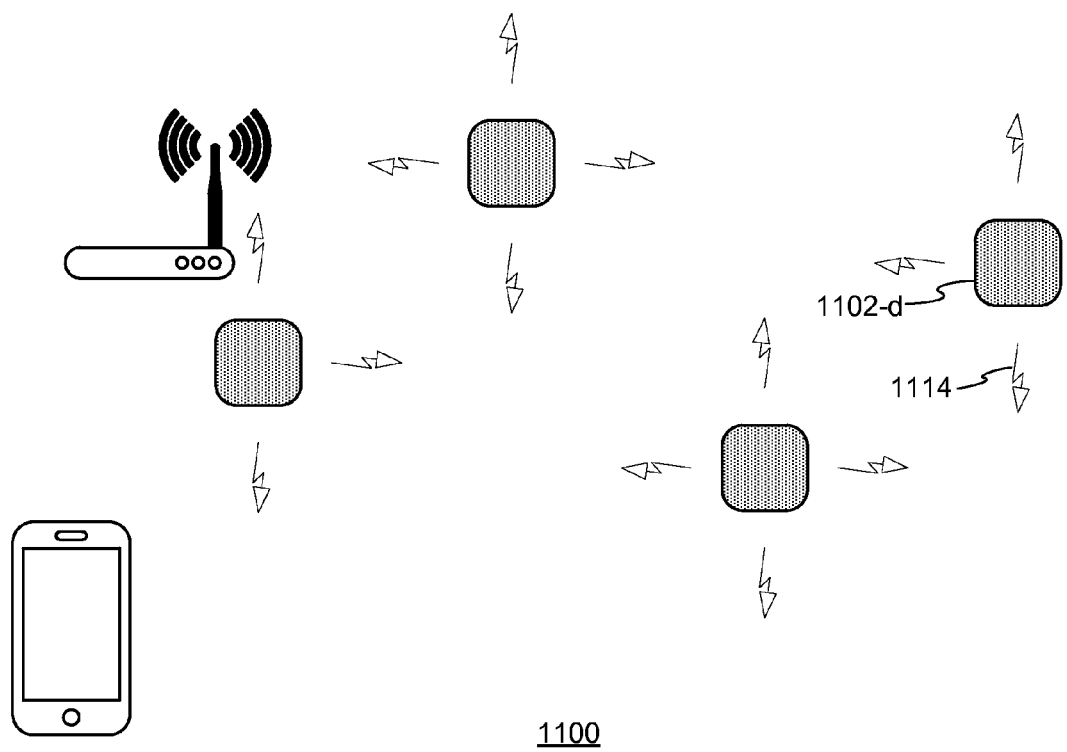

Upon receiving a wireless shutdown packet 1114, beacon 1102-*d* then transitions to the shutdown state and also begins transmitting wireless shutdown packets 1114, as illustrated in FIG. 11D. In this way, a cascading wave of wireless shutdown packets can be transmitted by wireless beacons so that a plurality of neighboring beacons can all be transitioned by receiving a transition instruction at a single beacon. Although FIG. 11D illustrates all beacons 1102 simultaneously in the shutdown state, depending on the length of time that beacons are configured to remain in the shutdown state, some beacons may transition to the dormant state before all beacons transition to the shutdown state.

Figure 11E:
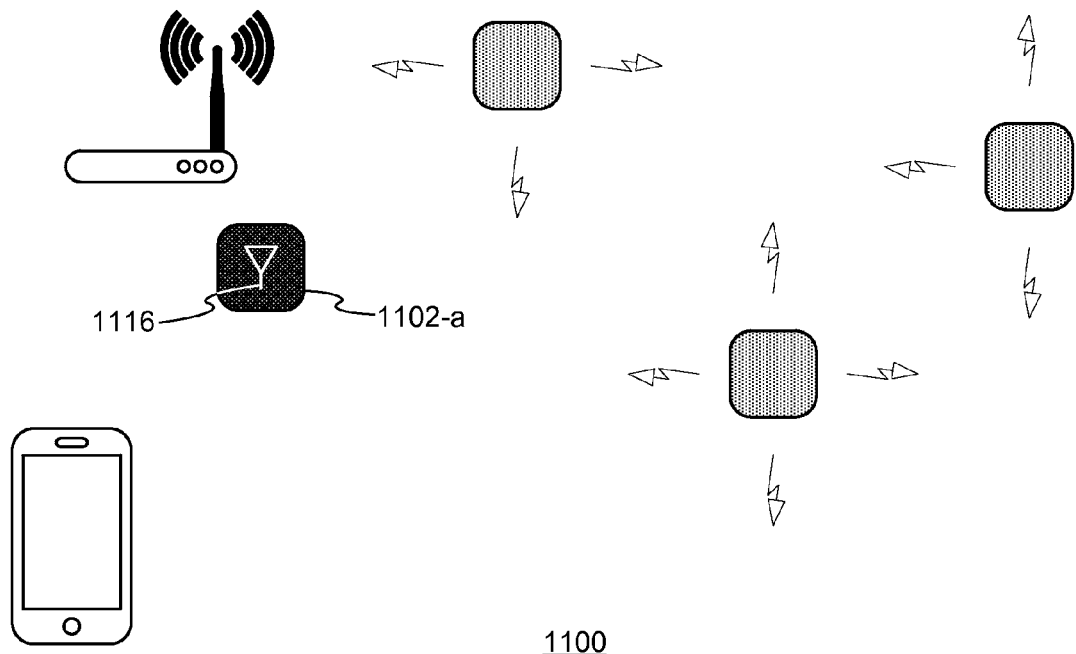
Figure 11F:
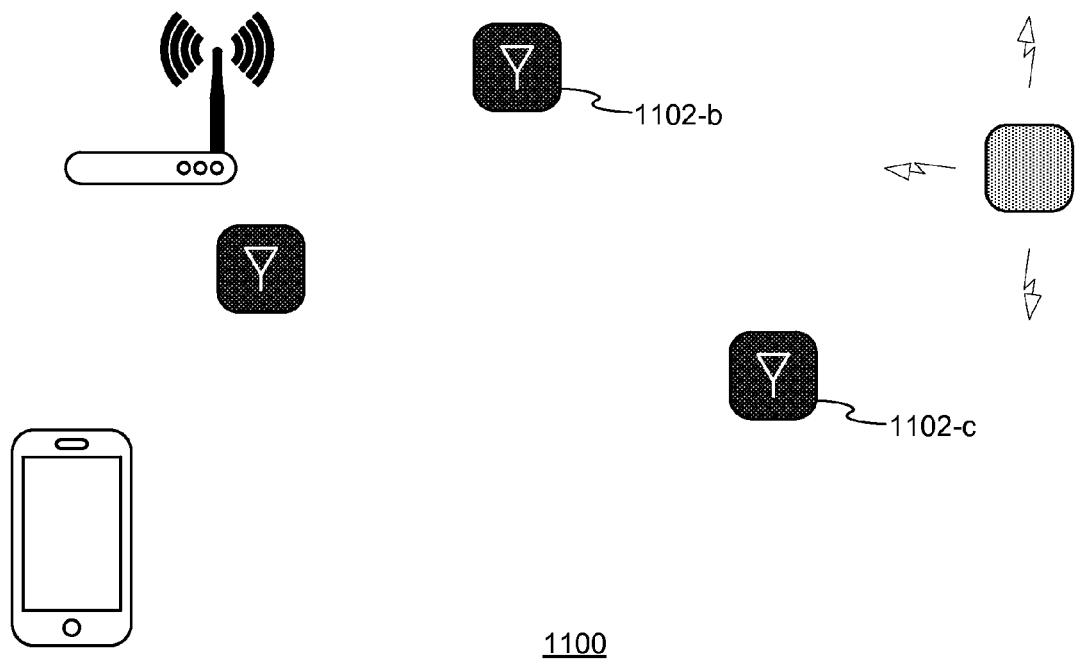
Figure 11G:
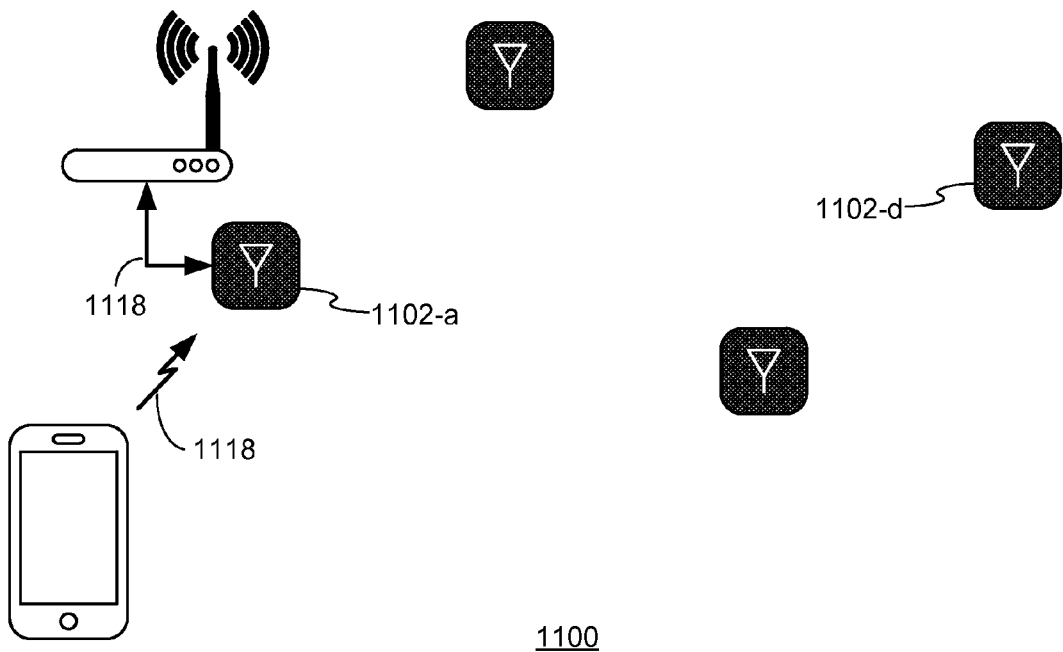

FIG. 11E shows that beacon 1102-*a* is the first beacon to transition to the dormant state, where it stops transmitting wireless shutdown packets. While in the dormant state, beacon 1102-*a* monitors for wakeup signals, as schematically depicted by antenna 1116, and ceases transmission of or reduces the frequency at which it transmits wireless advertisement packets. As shown in FIGS. 11F and 11G, beacons 1102-b, 1102-c and 1102-d, in turn, transition to the dormant state.

As desired, a wakeup signal can be transmitted to any one or more of beacons 1102 that are in the dormant state. FIG. 11G shows transmission of a wakeup signal 1118 to beacon 1102-a.

Figure 11H:
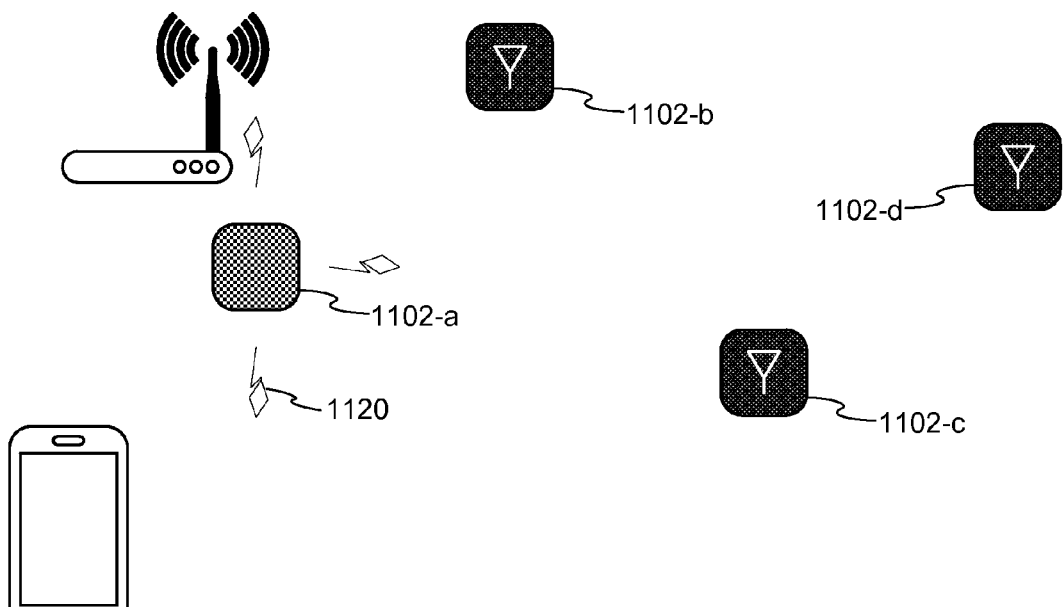

After receiving wakeup signal 1118, beacon 1102-a enters the wakeup state, as shown in FIG. 11H. While in the wakeup state, beacon 1102-a transmits wireless wakeup packets 1120 that include a wakeup signal and, because they are still in the dormant state, beacons 1102-b, 1102-c and 1102-d continue to monitor for wakeup signals. As illustrated, beacons 1102-b and 1102-c are within a reception range of the wireless wakeup packets 1120 transmitted by beacon 1102-a and so receive the transmitted wireless wakeup packets 1120.

Figure 11I:
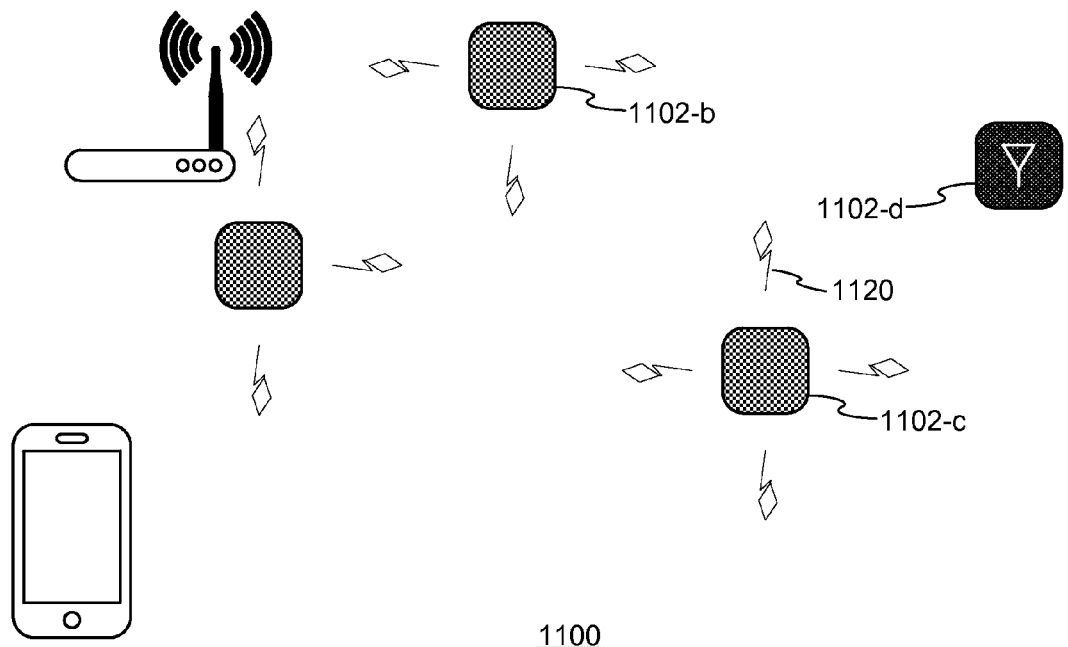

Upon receiving a wireless wakeup packet, beacons 1102-b and 1102-c transition to the wakeup state, as illustrated FIG. 11I, and begin transmitting wireless wakeup packets 1120, which may be received by beacon 1102-d.

Figure 11J:
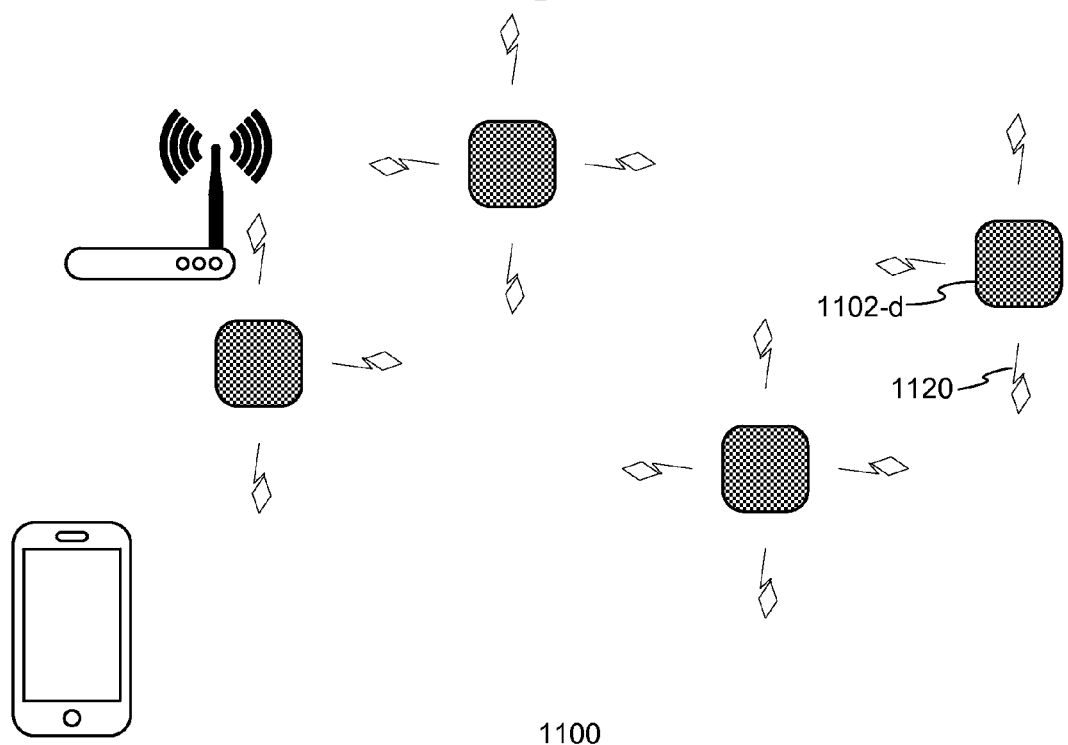

Upon receiving a wireless wakeup packet 1120, beacon 1102-d then transitions to the wakeup state and also begins transmitting wireless wakeup packets 1120, as illustrated in FIG. 11J. In this way, a cascading wave of wireless wakeup packets can be transmitted by wireless beacons so that a plurality of neighboring beacons can all be transitioned by receiving a transition instruction at a single beacon. Although FIG. 11J illustrates all beacons 1102 simultaneously in the wakeup state, depending on the length of time that beacons are configured to remain in the wakeup state, some beacons may transition to the active state before all beacons transition to the wakeup state.

Figure 11K:
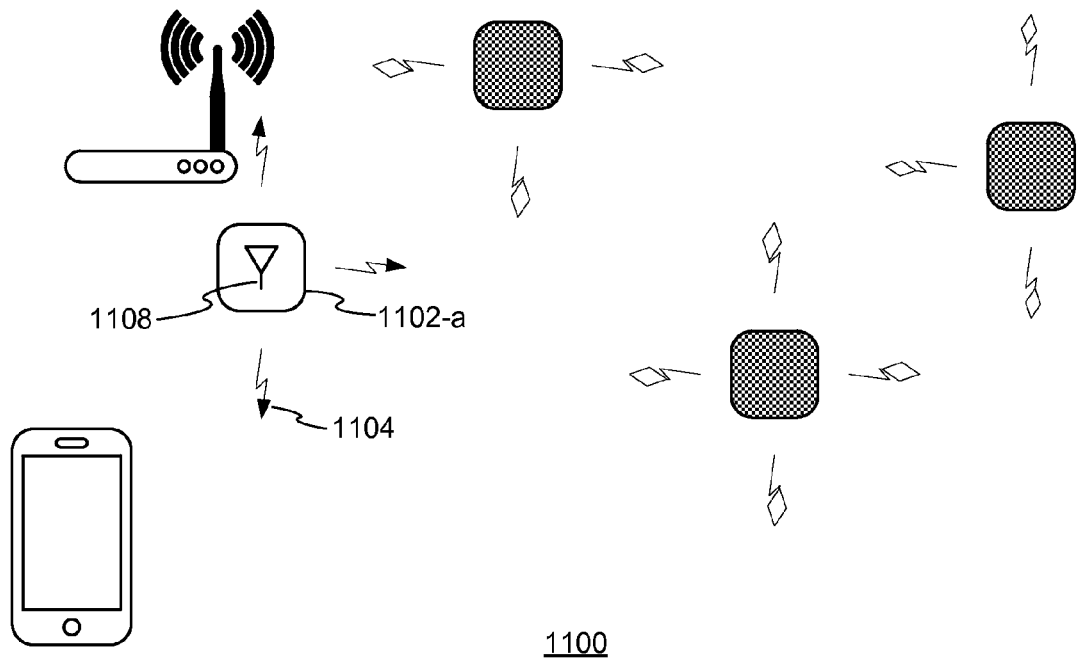
Figure 11L:
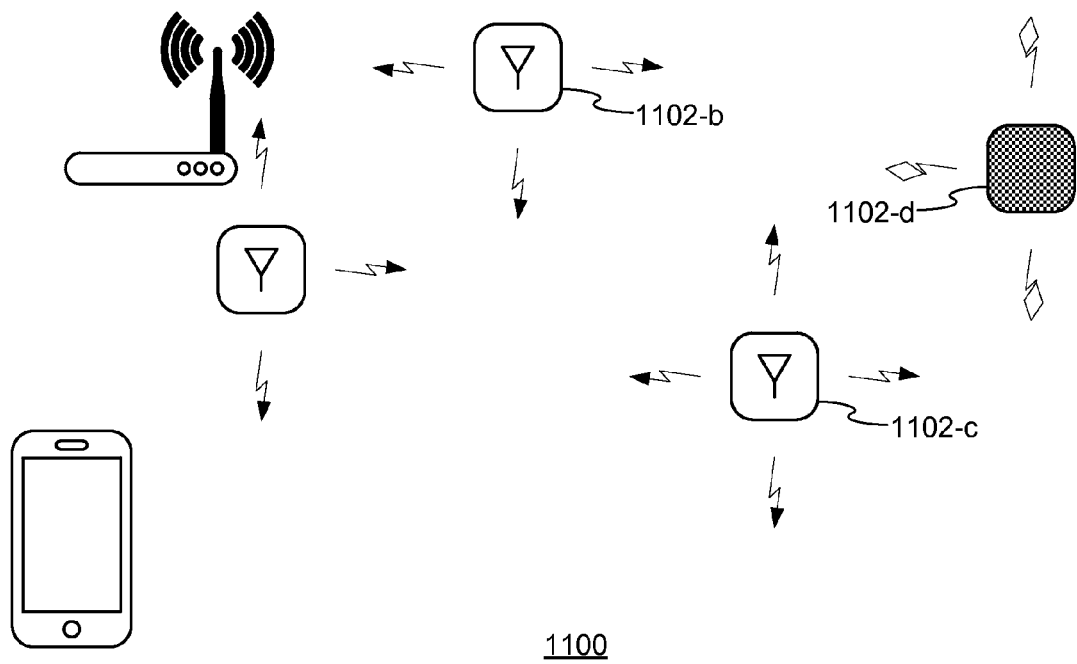

FIG. 11K shows that beacon 1102-a is the first beacon to transition to the active state, where it begins transmitting wireless advertisements 1104. As described above, while in the active state, beacon 1102-a monitors for shutdown signals, as schematically depicted by antenna 1108. As shown in FIG. 11L, beacons 1102-b and 1102-c, in turn, transition to the active state. After beacon 1102-d transitions to the active state, the wireless environment 1100 returns to that illustrated in FIG. 11A.

Various configurations can be employed to adjust the transitioning of beacons to other states. For example, the time that wireless beacons remain in an intermediate states, such as a shutdown state or a wakeup state, is independently adjustable on a beacon by beacon basis. For example, some beacons may have long shutdown states while others have short shutdown states. As another example, some beacons may have long wakeup states while others have short wakeup states. Further, the length of a shutdown and wakeup state is also independent of one another, such that a beacon can have a long or short wakeup state and a long or short shutdown state.

Other characteristics can also be independently adjustable on a beacon by beacon basis, such as transmission powers of wireless advertisements, wireless wakeup packets or wireless shutdown packets, or a frequency at which wireless advertisements, wireless wakeup packets or wireless shutdown packets are transmitted, or a frequency at which wakeup signals or shutdown packets are monitored for. Reducing a rate at which signals are transmitted or monitored for can result in a reduction of power by a wireless beacon. If a wireless beacon is battery powered, such power reduction may result in increased battery life.

Figure 12A:
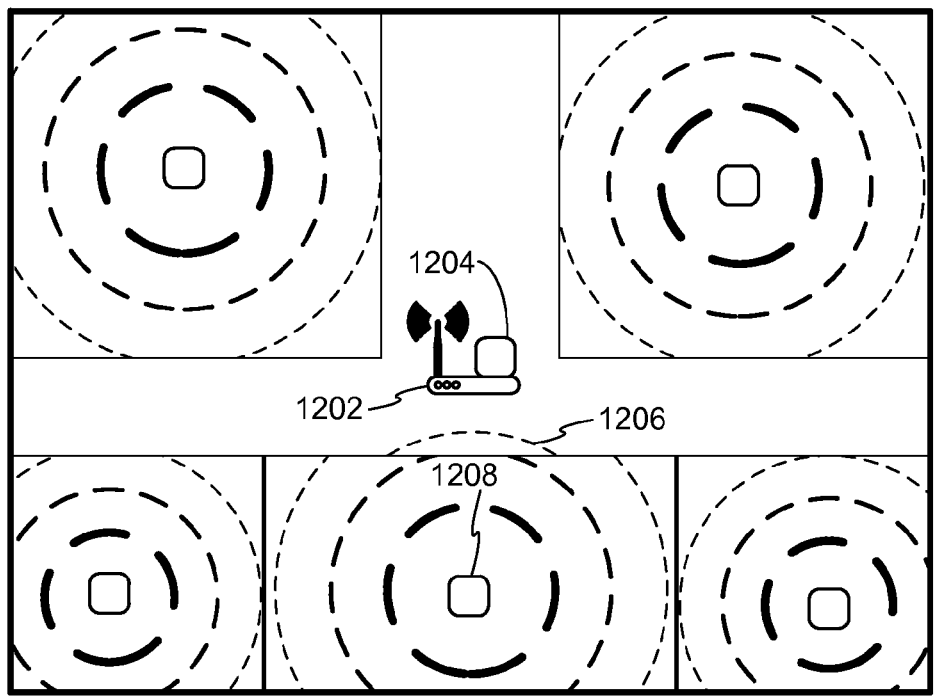
FIG. 12A and FIG. 12B provide illustrations of example wireless communications environments, in accordance with some embodiments.
Figure 12B:
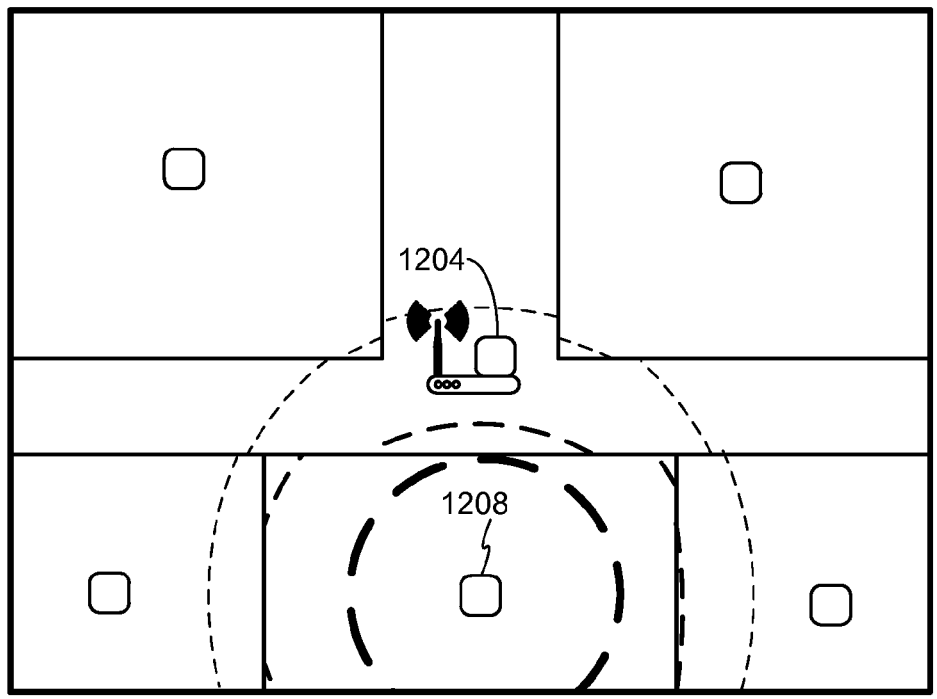

Besides increasing a battery life of a battery powered beacon, reducing a transmission power of a beacon can have other advantages. For example, in some environments, it may be possible to limit the transmission range of a wireless beacon signal through adjustments to a transmission power. FIGS. 12A and 12B illustrates a floor plan 1200 of a building including a hallway and a plurality of rooms. For simplicity, doorways are not shown. In FIG. 12A, a wireless access point 1202 is located in the hallway, and depicted to include a wireless beacon 1204 and/or other hardware to enable communication with other wireless beacons.

Each of the rooms contains a wireless beacon, showing signal strength of beacon signals, such as wireless advertisements, transmitted by each beacon. To reduce complexity of FIG. 12A, the signal strength of beacon 1204 is not depicted. In FIG. 12A, the transmission power of each beacon is approximately configured such that the beacon signals are primarily only detectable within the room containing the beacon. A small amount of signal 1206 from beacon 1208 may leak into the hallway, such as due to a transmission power of beacon 1208 being high enough to transmit through the wall. As depicted in FIG. 12A, all beacons lie outside of the detection range of other beacon's signals, including beacon 1204.

Such a configuration may be advantageous, such as to allow central devices present in the building to be able to quickly determine they are in one room or another by identifying the wireless beacons they can detect. For certain embodiments, however, it may be advantageous for a beacon's signals to periodically reach other beacons. For example, beacons may relay messages to one another, such as control or configuration messages or status requests from a remote server. Additionally, beacons may be configured to periodically announce their presence to other beacons or devices to ensure instructions may are relayed appropriately. Additionally, beacons may be configured to periodically announce their presence to other devices to enable a status of the beacons to be tracked. If beacons operate under reduced transmission power to limit the detectable range of their broadcasts, then by increasing the transmission power, their broadcasts can reach further distances.

FIG. 12B illustrates a configuration where the transmission power of beacon 1208 is increased as compared to FIG. 12A. To reduce the complexity of FIG. 12B, the signal strengths of all other beacons are not shown. In FIG. 12B, the signal strength of beacon 1208 extends to the hallway between rooms as well as into other rooms. As shown, the beacon signals transmitted by under these conditions will be detectable by beacon 1204, providing the ability to remotely monitor beacon 1208. As will be understood by the skilled artisan, the signal strength of beacon 1208 that is depicted in FIG. 12B is an approximation only for illustrative purposes. In embodiments, the actual extent that the wireless beacon signals reach will be determined by the beacon transmission power as well as the position, presence and materials of obstructions in the building, such as wall locations, material, thicknesses, etc.

In order to reduce power consumption by a battery powered beacon, however, but still maintain connectivity to other beacons and/or devices located outside of a target area, a battery powered beacon may periodically increase its transmission power to a higher level for certain periods, while keeping the transmission power at a lower level for other periods. In this way, power consumption is reduced overall as compared to a beacon that always transmits at the higher power level. During the periods of higher transmission power, the devices located outside the target area, i.e., outside of the detectable area for lower transmission power, can receive broadcasts from the beacon.

In one embodiment, a beacon transmits advertisement packets using a first power level that is sufficient for the advertisements to be detected within a target area. Periodically, the transmission power is increased to a second power level and one or more broadcasts, such as advertisement packets or announcement packets, are transmitted. The second power level is optionally sufficient for devices located outside the target area to detect the broadcasts. Various timers may be used by the beacon to enable the beacon to repeatedly broadcast one or more transmissions at the second power level, such as at regular intervals.

Figure 13:
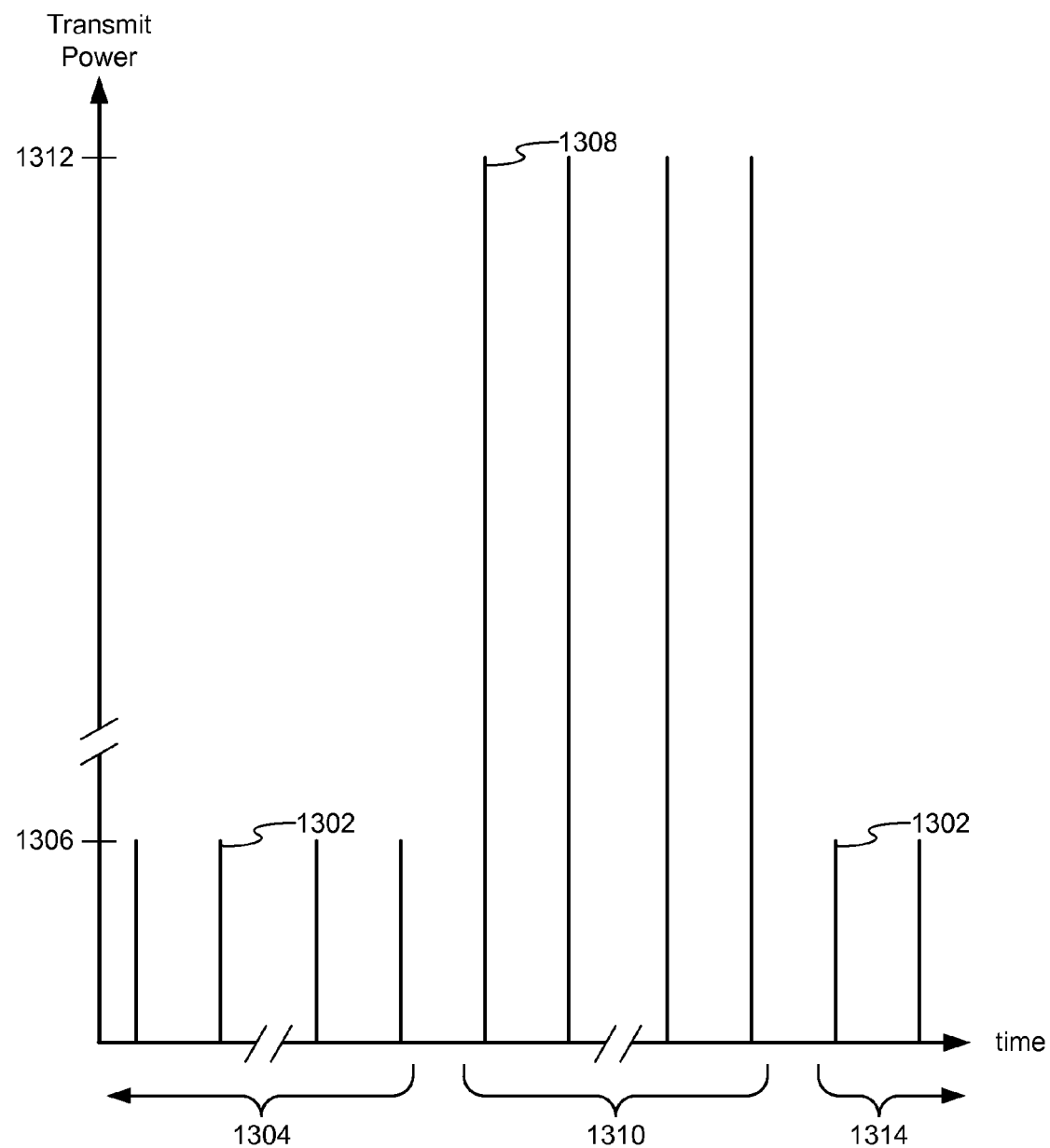
FIG. 13 provides a schematic illustration of a plot of transmission power as a function of time.

FIG. 13 provides a schematic plot of transmission power of a wireless beacon as a function of time to more clearly illustrate this concept. Initially, a series of wireless transmissions 1302, such as advertisement packets, are transmitted during time period 1304 at a transmission power 1306. Thereafter, a series of higher power transmissions 1308, such as announcement packets, are transmitted during time period 1310 at a transmission power 1312. Following this, the transmission power is again reduced and additional transmissions 1308, such as announcement packets, are transmitted during time period 1314 at a transmission power 1306. As used herein an announcement packet is a wireless transmission by a wireless beacon. In some embodiments, an announcement packet is an advertisement packet. In some embodiments, an announcement packet is transmitted on a specific wireless channel/frequency different from that used by advertisement packets. In some embodiments, an announcement packet includes different transmission characteristics and/or data contents that distinguish it from an advertisement packet.

In various embodiments, services may be provided to a central device having appropriate authority when it is within detection range of advertisements transmitted by one of the wireless beacons. Referring back to FIG. 12A, as one example, a central device that enters the room of beacon 1208 may be granted access permissions to control various other devices present in the room of beacon 1208. For example, in one embodiment, beacon 1208 is present in a conference room and a central device, such as a smartphone, may be granted authority to control a projector present in the conference room when it enters the room of beacon 1208 and is, therefore, within detection range of advertisements transmitted by beacon 1208.

Figure 14:
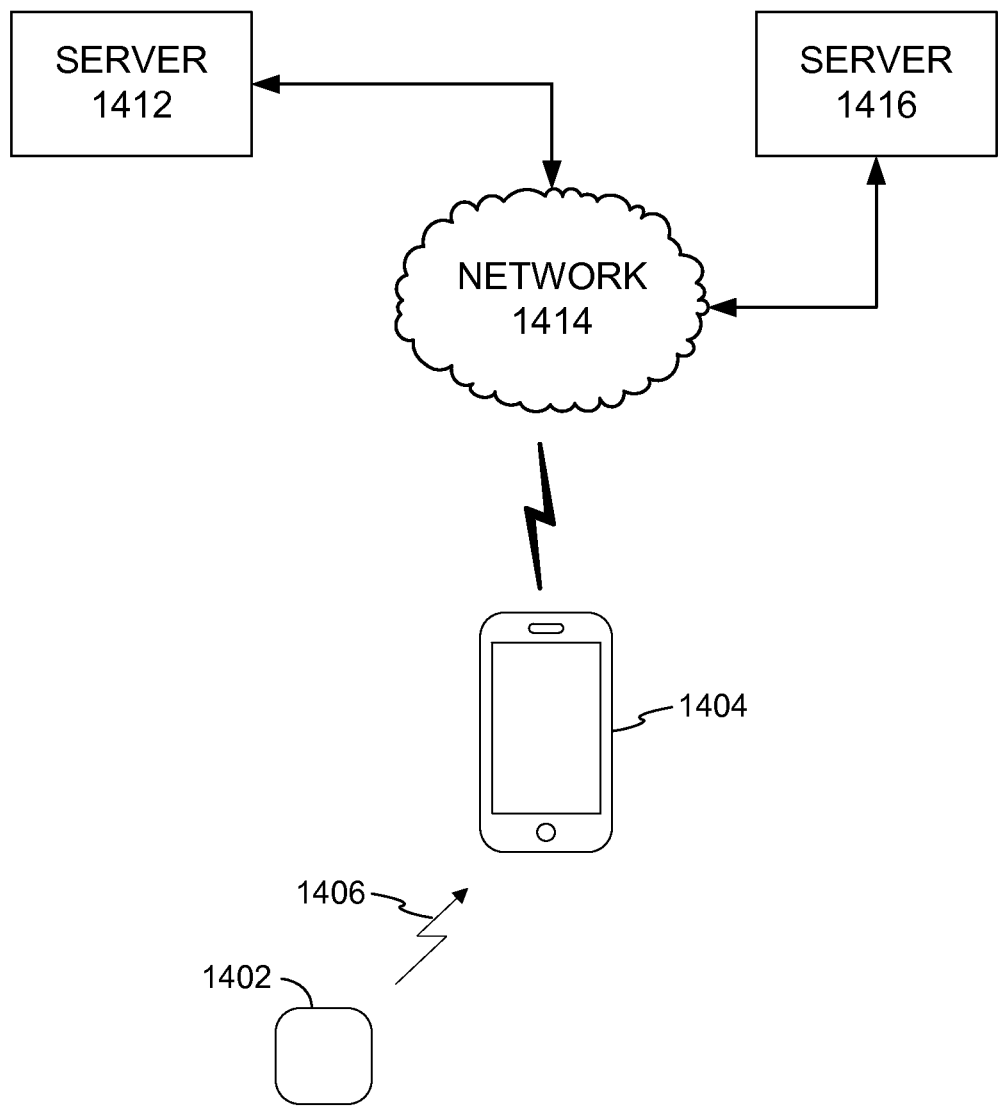
FIG. 14 provides an illustration of an example wireless communications environment, in accordance with some embodiments.

FIG. 14. illustrates a wireless communications environment 1400 including a wireless beacon 1402 and a smartphone 1404. When positioned within detection range of wireless beacon 1402, smartphone 1404 receives beacon signals, such as advertisement packets 1406, from wireless beacon 1402. Smartphone 1404 can include software or firmware that causes smartphone 1404 to transmit a request to server 1412, such as by way of network 1414, upon detection of an advertisement packet 1406 from wireless beacon 1402. In this way, events can be triggered by smartphone 1404 entering the proximity of beacon 1402. For example, server 1412 can return instructions to smartphone 1404 to perform an operation. As another example, server 1412 can provide data to smartphone 1404. As another example, server 1412 can query another server 1416 for data, which can be returned directly to smartphone 1404 by server 1416 or can be returned to server 1412 for further operations, such as processing or to provide the data to smartphone 1404.

Figure 15:
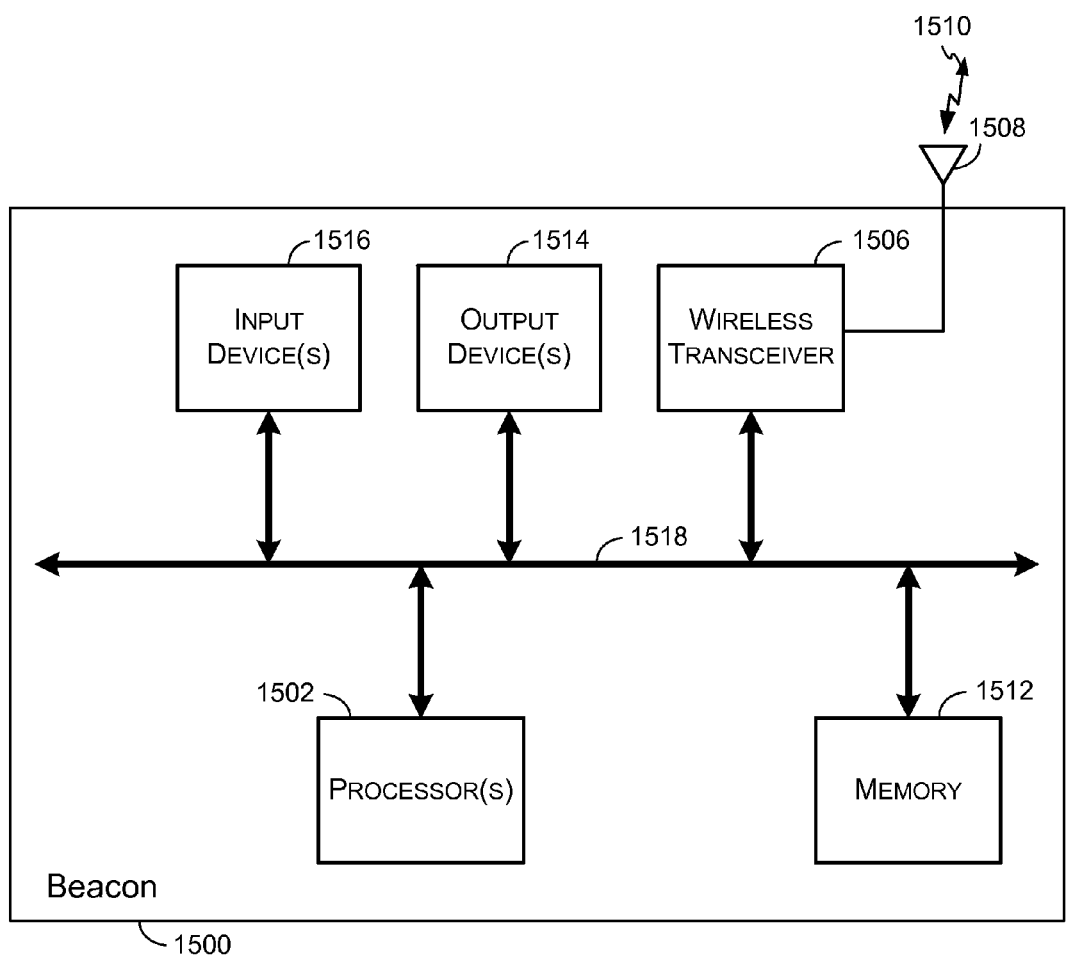
FIG. 15 is a block diagram illustrating an example of a beacon, in accordance with some embodiments.

FIG. 15 illustrates an example of a beacon 1500. The beacon 1500 includes hardware elements that can be electrically coupled via a bus 1518 (or may otherwise be in communication, as appropriate). In one embodiment, the bus 1518 can be used for the processor(s) 1502 to communicate between cores and/or with the memory 1512. The hardware elements may include one or more processors 1502, including without limitation one or more general-purpose processors and/or one or more special-purpose processors (such as digital signal processing chips, graphics acceleration processors, and/or the like); one or more input devices 1516; one or more output devices 1514; and one or more wireless transceivers 1506. Optionally, input device 1516 can include numerous devices including, without limitation, a camera, a mouse, a keyboard, a touch sensitive screen, a touch pad, a keypad, and/or the like. However, as a beacon is typically a low power or standalone device in many embodiments, few input devices may be included in a beacon. For example, embodiments are contemplated where no input devices are included. Other embodiments are included where a single input device is included, such as a button, which is optionally used to reset, power cycle a beacon or provide other input. Optionally, output device 1514 can include numerous devices including, but not limited to, a display, a printer and/or the like. However, embodiments are contemplated where no output devices are included. Other embodiments are contemplated where only a single output device is included, such as a light emitting diode, that may provide a visible indication of a status of a beacon, for example.

The beacon 1500 includes one or more wireless transceivers 1506 connected to the bus 1518. The wireless transceiver 1506 may be operable to transmit and/or receive wireless signals (e.g., signal 1510) via antenna 1508. A wireless signal 1510 received by beacon 1500 may be transmitted via a wireless device compliant with a wireless communications standard that the beacon 1500 supports. A wireless signal 1510 transmitted by beacon 1500 may be a wireless signal compliant with a wireless communications standard that the beacon 1500 supports. For example, embodiments are contemplated where the wireless communications standard is one or more of Bluetooth, Zigbee, Z-Wave, and other low power radio frequency data communications standards. In an exemplary embodiment, the wireless communications standard is a Bluetooth standard, such as Bluetooth 4.0 and/or Bluetooth Low Energy. Wireless transceiver 1506 may be configured to transmit and/or receive various radio frequency (RF) signals (e.g., signal 1510) via antenna 1508 from one or more central devices, peripheral devices, gateways, network devices, other access devices, cloud networks, and/or the like. Beacon 1500 may also be configured to decode and/or decrypt various signals received. In some embodiments, the wireless beacon 1500 is configured such that the wireless transceiver 1506 only receives signals but does not transmit signals. In some embodiments, the wireless beacon 1500 is configured such that the wireless transceiver 1506 only transmits signals but does not receive signals.

The beacon 1500 may further include (and/or be in communication with) one or more non-transitory machine-readable storage mediums or storage devices (e.g., memory 1512), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1512, such as RAM, ROM, FLASH, or disc drive, and executed by processor(s) 1502. The beacon 1500 can also comprise software elements (e.g., located within the memory 1512), including, for example, an operating system, device drivers, executable libraries, and/or other code, such as one or more application programs, which may comprise computer programs implementing various functions. Memory 1512 may be a non-transitory machine-readable storage medium, processor-readable memory, and/or a computer-readable memory that stores the one or more computer-program products configured to cause the processor(s) 1502 to perform various functions. In other embodiments, various functions described may be performed in hardware.

Figure 16:
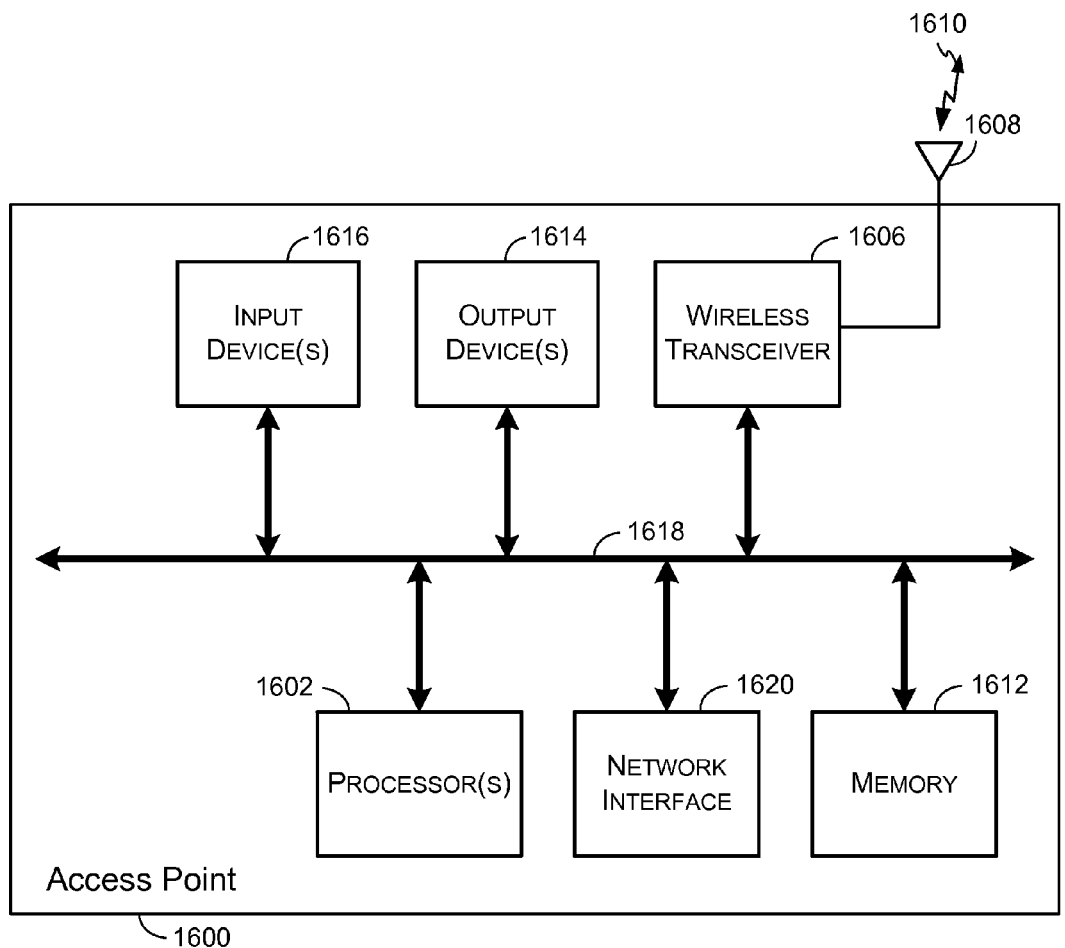
FIG. 16 is a block diagram illustrating an example of an access point, in accordance with some embodiments.

FIG. 16 illustrates an example of an access point 1600. The access point 1600 may optionally include or otherwise function as a range extending device, a router, a gateway, a modem, and/or any other device that provides network access among one or more computing devices and/or networks. For example, access point 1600 may include a router gateway with access point and router functionality, and may further include an Ethernet switch and/or a modem. As another example, the access point 1600 may include a range extender that may be used to improve signal range and strength within a wireless network by taking an existing signal from another access point and rebroadcasting the signal to create an expanded logical network.

The access point 1600 includes hardware elements that can be electrically coupled via a bus 1618 (or may otherwise be in communication, as appropriate). In one embodiment, the bus 1618 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like); one or more input devices 1616, which can include without limitation one or more buttons, a keyboard, a keypad, a touch sensitive screen, a touch pad, and/or the like; and one or more output devices 1614, which can include, without limitation, a display, light or sound indicators, and/or the like.

The access point 1600 may include one or more wireless transceivers 1606 connected to the bus 1618. In various embodiments, external wireless transceivers can be connected to the bus 1618, such as via output device 1614 and input device 1616. For example, in one embodiment, an external wireless transceiver is connected to access device 1600 via a Universal Serial Bus (USB) connection. The wireless transceiver 1606 may be operable to receive and transmit wireless signals (e.g., a wireless signal 1610) via an antenna 1608. The wireless transceiver 1606 may include a transceiver radio designed to transmit and receive signals in compliance with a wireless communications standard. Exemplary wireless communications standards include, but are not limited to, IEEE 802.11 (also referred to herein as WiFi or Wi-Fi), Bluetooth, Zigbee, UWB, wireless USB and Z-Wave. In various embodiments, a wireless communications standard specifies frequency bands, channels, data packet characteristics and other transmission characteristics necessary for inter device-communication. For example, wireless transceiver 1606 may include a 2.4 GHz WiFi circuit. Accordingly, the access point 1600 may include a single WiFi circuit for a WiFi communications, and a single Bluetooth circuit for Bluetooth communications. In some embodiments, the access point 1600 may include multiple wireless transceivers (not shown) for each available communications standard. The antenna 1608 may include multiple band antennas that can transmit and/or receive signals over different frequency bands.

The access point 1600 may further include a radio frequency (RF) circuit. In some embodiments, the wireless transceiver 1606 may be integrated with or coupled to the RF circuit so that the RF circuit includes the wireless transceiver 1606. In some embodiments, the wireless transceiver 1606 and the RF circuit are separate components. The RF circuit may include a RF amplifier that may amplify signals received over antenna 1608. The RF circuit may also include a power controller that may be used to adjust signal amplification by the RF amplifier. The power controller may be implemented using hardware, firmware, software, or any combination thereof.

The wireless signal 1610 may be transmitted via a wireless communication channel. In some embodiments, the wireless communication channel may be any wireless communication channel established between two or more devices, such as a wireless local area network (e.g., a WiFi network), a Personal Access Network (e.g., between Bluetooth, Zigbee, UWB or wireless USB compatible devices), or a cellular network (e.g., a GSM, WCDMA, LTE, CDMA2000 network). The wireless transceiver 1606 may be configured to receive various radio frequency (RF) signals (e.g., signal 1610) via antenna 1608, respectively, from one or more other access points, network devices, network devices, beacons and/or the like. Access point 1600 may also be configured to decode and/or decrypt various signals received from one or more access points, network devices, wireless devices, and/or the like.

The access point 1600 may include a power supply (not shown) that can power the various components. The power supply may include a switch-mode power supply, a linear power supply, a push-pull power supply, or any other suitable type of power supply. In some embodiments, the access point 1600 may include multiple power supplies. For example, a switch-mode power supply may be used to condition input power, and a linear power supply may be used to power the RF circuit. The power supply may be configured to operate over various ranges of appropriate input voltages.

Alternatively, the access point 1600 may include circuitry for receiving voltage, current or power via an external power supply or a Power over Ethernet connection. Power over Ethernet support is optionally provided by network interface 1620. Network interface 1620 can provide for network connections to external devices via any standardized or specialized network connection, such as IEEE 802.3. In an exemplary embodiment, network interface 1620 provides support for a wired Ethernet connection to a network. Other wired network technologies are contemplated for connection to networks, as will be understood by the skilled artisan; however, due to its ubiquitous nature and support for Power over Ethernet, wired Ethernet over twisted pairs may be preferentially employed.

The access point 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1612, such as RAM, ROM, FLASH, or disc drive, and executed by processor(s) 1602. The access point 1600 can also comprise software elements (e.g., located within the memory 1612), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 17:
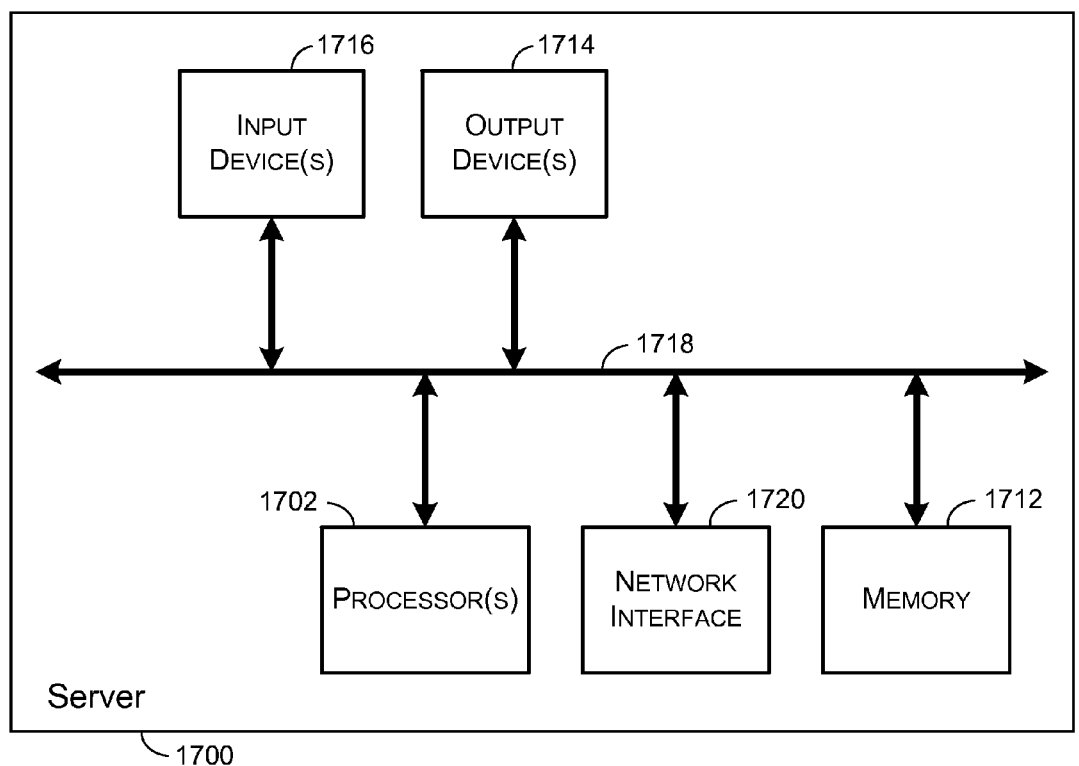
FIG. 17 is a block diagram illustrating an example of a server, in accordance with some embodiments.

FIG. 17 illustrates an example of a server 1700. The server 1700 includes hardware elements that can be electrically coupled via a bus 1718 (or may otherwise be in communication, as appropriate). In one embodiment, the bus 1718 can be used for the processor(s) 1702 to communicate between cores and/or with the memory 1712. The hardware elements may include one or more processors 1702, including without limitation one or more general-purpose processors and/or one or more special-purpose processors (such as digital signal processing chips, graphics acceleration processors, and/or the like), memory 1712, output devices 1714, input devices 1716, a bus 1718 and a network interface. Furthermore, in addition to the network interface 1720, server 1700 can optionally further include a wireless transceiver to communicate with a network (e.g., a wireless local area network, a wireless network of a preferred carrier, Internet, etc.).

The server 1700 may further include (and/or be in communication with) one or more non-transitory machine-readable storage mediums or storage devices (e.g., memory 1712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1712. The server 1700 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the aspects of methods described herein, such as centralized management and control over wireless access points, beacons, etc. The memory 1712 may be a non-transitory machine-readable storage medium, processor-readable memory, and/or a computer-readable memory that stores the one or more computer-program products configured to cause the processor(s) 1702 to perform the functions described. In other embodiments, one or more of the functions described may be performed in hardware.

A set of these instructions and/or code is optionally stored on a non-transitory machine-readable storage medium, such as the memory 1712. In some cases, the storage medium is optionally incorporated within a computer system. In other embodiments, the storage medium is optionally separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1700 and/or may take the form of source and/or installable code, which, upon compilation and/or installation on the server 1700 (e.g., using any of a variety of generally available compilers, installation programs, compression/decompression utilities, etc.) then takes the form of executable code.

Merely by way of example, one or more procedures described with respect to the processes discussed above, for example as described with respect to FIGS. 2, 3A-3C, 9 and 10 may be implemented as code and/or instructions executable by a computer or device (and/or a processor within a computer or device); in an aspect, then, such code and/or instructions can be used to configure and/or adapt a general purpose computer (or other device) to perform one or more operations in accordance with the described methods. Such functions or code may include code to perform the steps described above with respect to FIGS. 2, 3A-3C, 9 and 10. The memory may be a non-transitory machine-readable storage medium, processor-readable memory, and/or a computer-readable memory that stores the one or more computer-program products configured to cause the processor(s) to perform the functions described. In other embodiments, one or more of the functions described may be performed in hardware.

A set of these instructions and/or code might be stored on a non-transitory machine-readable storage medium, such as the memory. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by a computer or device and/or might take the form of source and/or installable code, which, upon compilation and/or installation on the computer or device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer implemented method, comprising:
   transmitting, by a wireless beacon, wireless advertisement packets;
   monitoring for wireless transmissions including beacon shutdown signals, wherein beacon shutdown signals trigger wireless beacons to transition to dormant states;
   receiving a shutdown transmission including a beacon shutdown signal;
   transmitting a wireless shutdown packet, wherein wireless shutdown packets include beacon shutdown signals;
   reducing a transmission rate of or ceasing transmission of the advertisement packets;
   monitoring for wireless transmissions including beacon wakeup signals, wherein beacon wakeup signals trigger wireless beacons to transition to an active state;
   receiving a wakeup transmission including a beacon wakeup signal; and
   transmitting a wireless wakeup packet, wherein wireless wakeup packets include beacon wakeup signals.

2. The method of claim 1, wherein the wireless beacon is compliant with a Bluetooth standard.

3. The method of claim 1, wherein receiving the transmitted wireless shutdown packet at other wireless beacons facilitates transitioning the other wireless beacons to dormant states.

4. The method of claim 1, wherein receiving the transmitted wireless shutdown packet at other wireless beacons facilitates transmission of wireless shutdown packets by the other wireless beacons.

5. The method of claim 1, wherein receiving the transmitted wireless wakeup packet at other wireless beacons facilitates transitioning the other wireless beacons to active states.

6. The method of claim 1, wherein receiving the transmitted wireless wakeup packet at other wireless beacons facilitates transmission of wireless wakeup packets by the other wireless beacons.

7. The method of claim 1, wherein receiving the shutdown transmission includes receiving a wireless packet including the beacon shutdown signal or receiving the shutdown transmission using a wired data connection.

8. The method of claim 1, wherein receiving the wakeup transmission includes receiving a wireless packet including the beacon wakeup signal or receiving the wakeup transmission using a wired data connection.

9. The method of claim 1, wherein transmitting the wireless shutdown packet includes transmitting wireless packets including beacon shutdown signals for a specified time period.

10. The method of claim 1, wherein transmitting the wireless shutdown packet includes transmitting wireless packets including beacon wakeup signals for a specified time period.

11. The method of claim 1, wherein the wireless beacon is battery powered and wherein reducing or ceasing transmission of advertisement packets reduces battery usage by the wireless beacon.

12. The method of claim 1, further comprising:
    receiving a scan request; and
    transmitting a scan response, wherein the scan response includes status information associated with the wireless beacon.

13. The method of claim 12, wherein receiving the scan response at a controller facilitates management of the wireless beacon by the controller.

14. A system comprising:
    one or more processors; and
    a non-transitory computer readable storage medium communicatively coupled to the one or more processors, wherein the non-transitory computer readable storage medium includes instructions that, when executed by the one or more processors, causes the one or more processors to perform operations including:
       transmitting, by a wireless beacon, wireless advertisement packets;
       monitoring for wireless transmissions including beacon shutdown signals, wherein beacon shutdown signals trigger wireless beacons to transition to dormant states;
       receiving a shutdown transmission including a beacon shutdown signal;
       transmitting a wireless shutdown packet, wherein wireless shutdown packets include beacon shutdown signals;
       reducing a transmission rate of or ceasing transmission of the advertisement packets;
       monitoring for wireless transmissions including beacon wakeup signals, wherein beacon wakeup signals trigger wireless beacons to transition to an active state;
       receiving a wakeup transmission including a beacon wakeup signal; and
       transmitting a wireless wakeup packet, wherein wireless wakeup packets include beacon wakeup signals.

15. The system of claim 14, wherein the wireless beacon is compliant with a Bluetooth standard.

16. The system of claim 14, wherein receiving the transmitted wireless shutdown packet at other wireless beacons facilitates transitioning the other wireless beacons to dormant states.

17. The system of claim 14, wherein receiving the transmitted wireless shutdown packet at other wireless beacons facilitates transmission of wireless shutdown packets by the other wireless beacons.

18. The system of claim 14, wherein receiving the transmitted wireless wakeup packet at other wireless beacons facilitates transitioning the other wireless beacons to active states.

19. The system of claim 14, wherein receiving the transmitted wireless wakeup packet at other wireless beacons facilitates transmission of wireless wakeup packets by the other wireless beacons.

20. A non-transitory computer readable medium comprising instructions that, when executed by the one or more processors, cause the one or more processors to perform operations including:
- transmitting, by a wireless beacon, wireless advertisement packets;
- monitoring for wireless transmissions including beacon shutdown signals, wherein beacon shutdown signals trigger wireless beacons to transition to dormant states;
- receiving a shutdown transmission including a beacon shutdown signal;
- transmitting a wireless shutdown packet, wherein wireless shutdown packets include beacon shutdown signals;
- reducing a transmission rate of or ceasing transmission of the advertisement packets;
- monitoring for wireless transmissions including beacon wakeup signals, wherein beacon wakeup signals trigger wireless beacons to transition to an active state;
- receiving a wakeup transmission including a beacon wakeup signal; and
- transmitting a wireless wakeup packet, wherein wireless wakeup packets include beacon wakeup signals.

\* \* \* \* \*